(12) United States Patent
Ansari et al.

(10) Patent No.: US 9,117,058 B1
(45) Date of Patent: Aug. 25, 2015

(54) MONITORING SERVICES AND PLATFORM FOR MULTIPLE OUTLETS

(75) Inventors: Salman Ansari, San Francisco, CA (US); Eran Cedar, San Francisco, CA (US); Noah Horton, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 40 days.

(21) Appl. No.: 13/004,796

(22) Filed: Jan. 11, 2011

Related U.S. Application Data

(60) Provisional application No. 61/427,000, filed on Dec. 23, 2010.

(51) Int. Cl.
G06F 21/00 (2013.01)
G06F 21/10 (2013.01)

(52) U.S. Cl.
CPC .................................. G06F 21/105 (2013.01)

(58) Field of Classification Search
CPC .................................................... G06F 21/105
See application file for complete search history.

(56) References Cited

U.S. PATENT DOCUMENTS

| | | | |
|---|---|---|---|
| 7,599,935 B2 | 10/2009 | La Rotonda et al. | |
| 7,873,988 B1 * | 1/2011 | Issa et al. | 726/4 |
| 8,296,380 B1 | 10/2012 | Kelly et al. | |
| 8,402,057 B2 * | 3/2013 | Shin | 707/783 |
| 2001/0040889 A1 * | 11/2001 | Matsuzaki et al. | 370/389 |
| 2002/0032037 A1 * | 3/2002 | Segawa | 455/517 |
| 2002/0069106 A1 * | 6/2002 | Shopsowitz | 705/14 |
| 2003/0187801 A1 * | 10/2003 | Chase, Jr. et al. | 705/59 |
| 2004/0003270 A1 * | 1/2004 | Bourne et al. | 713/193 |
| 2004/0167926 A1 * | 8/2004 | Waxman et al. | 707/104.1 |
| 2004/0168077 A1 * | 8/2004 | Waxman et al. | 713/200 |
| 2004/0249815 A1 * | 12/2004 | Lee | 707/9 |
| 2005/0044049 A1 * | 2/2005 | Okayama et al. | 705/59 |
| 2005/0097359 A1 * | 5/2005 | Speare et al. | 713/201 |
| 2005/0119977 A1 * | 6/2005 | Raciborski | 705/59 |
| 2006/0074915 A1 | 4/2006 | Bhandarkar et al. | |
| 2006/0173788 A1 * | 8/2006 | Nath Pandya et al. | 705/59 |
| 2006/0229990 A1 * | 10/2006 | Shimoji et al. | 705/50 |
| 2008/0073936 A1 | 3/2008 | Jeng | |
| 2008/0086439 A1 * | 4/2008 | Brough et al. | 706/47 |
| 2008/0097923 A1 * | 4/2008 | Kim et al. | 705/59 |
| 2008/0116255 A1 * | 5/2008 | Hilbert et al. | 235/375 |
| 2008/0184138 A1 | 7/2008 | Krzanowski et al. | |
| 2009/0125420 A1 | 5/2009 | Zhang | |
| 2009/0164904 A1 | 6/2009 | Horowitz et al. | |

(Continued)

OTHER PUBLICATIONS

McNay; Enterprise content management: an overview; Published in: Professional Communication Conference, 2002. IPCC 2002. Proceedings. IEEE International; Date of Conference: 2002; pp. 396-402; IEEE Xplore.*

Koskinen; Social software for industrial interaction; Published in: Proceeding OZCHI '06 Proceedings of the 18th Australia conference on Computer-Human Interaction: Design: Activities, Artefacts and Environments; 2006; pp. 381-384; ACM Digital Library.*

Non-final Office Action dated Apr. 1, 2013, for U.S. Appl. No. 13/004,790.

(Continued)

*Primary Examiner* — Bradley Holder
(74) *Attorney, Agent, or Firm* — Vista IP Law Group, LLP

(57) ABSTRACT

A monitoring services and platform for multiple outlets includes: communicating with a plurality of sources in order to obtain at least one piece of content from each one of the plurality of sources; displaying, via a central user interface, the obtained content; and displaying, via the central user interface, a control which if selected causes an action to be performed on at least one piece of the displayed content.

29 Claims, 19 Drawing Sheets

(56) References Cited

U.S. PATENT DOCUMENTS

| | | |
|---|---|---|
| 2010/0312769 A1* | 12/2010 | Bailey et al. .................. 707/740 |
| 2011/0047479 A1 | 2/2011 | Ghosh |
| 2011/0181906 A1 | 7/2011 | Grueneberg et al. |
| 2011/0213670 A1 | 9/2011 | Strutton et al. |
| 2011/0307791 A1 | 12/2011 | Pierre et al. |
| 2012/0042020 A1 | 2/2012 | Kolari et al. |
| 2012/0109777 A1 | 5/2012 | Lipsitz et al. |
| 2012/0158494 A1 | 6/2012 | Reis et al. |
| 2012/0167137 A1 | 6/2012 | Wong et al. |

OTHER PUBLICATIONS

Non-final Office Action dated Oct. 6, 2014, for U.S. Appl. No. 13/004,790.

Final Office Action dated Oct. 25, 2013, for U.S. Appl. No. 13/004,790.

Final Office Action dated May 6, 2015, for related U.S. Appl. No. 13/004,790.

* cited by examiner

FIG. 18

MONITORING SERVICES AND PLATFORM FOR MULTIPLE OUTLETS

CROSS REFERENCE TO OTHER APPLICATIONS

This application claims priority to U.S. Provisional Patent Application No. 61/427,000 entitled MONITORING SERVICES AND PLATFORM FOR MULTIPLE OUTLETS filed Dec. 23, 2010 which is incorporated herein by reference for all purposes.

BACKGROUND OF THE INVENTION

People who manage brands ("brand managers") are interested in monitoring commentary on the internet regarding their brands or competitors' brands. Brand managers may read the commentary to gauge interest in their marketing materials, receive feedback regarding their products, or take further action regarding any inflammatory postings. Interactive websites such as social networks and blogs, for example, are part of a growing market for online brand marketing. Typical methods for brand management across interactive websites include manually creating accounts for each of the websites and frequently checking the content posted to such accounts or periodically querying online (e.g., via a search engine) for information regarding the relevant brands. Often times, the same website or webpage consistently contain commentary or other information that is of interest to brand managers. Depending on the type of commentary posted to a particular website, brand managers may desire to take action with respect to the particular commentary or base further marketing methods upon such commentary. However, monitoring content through manually creating and checking accounts or online queries is time consuming and also difficult to coordinate among multiple brand managers working with the same brand(s). It would be desirable to develop new techniques to monitor online commentary relevant across

BRIEF DESCRIPTION OF THE DRAWINGS

Various embodiments of the invention are disclosed in the following detailed description and the accompanying drawings.

FIG. 18 is a diagram of an embodiment of an email notification.

DETAILED DESCRIPTION

Figure 1:
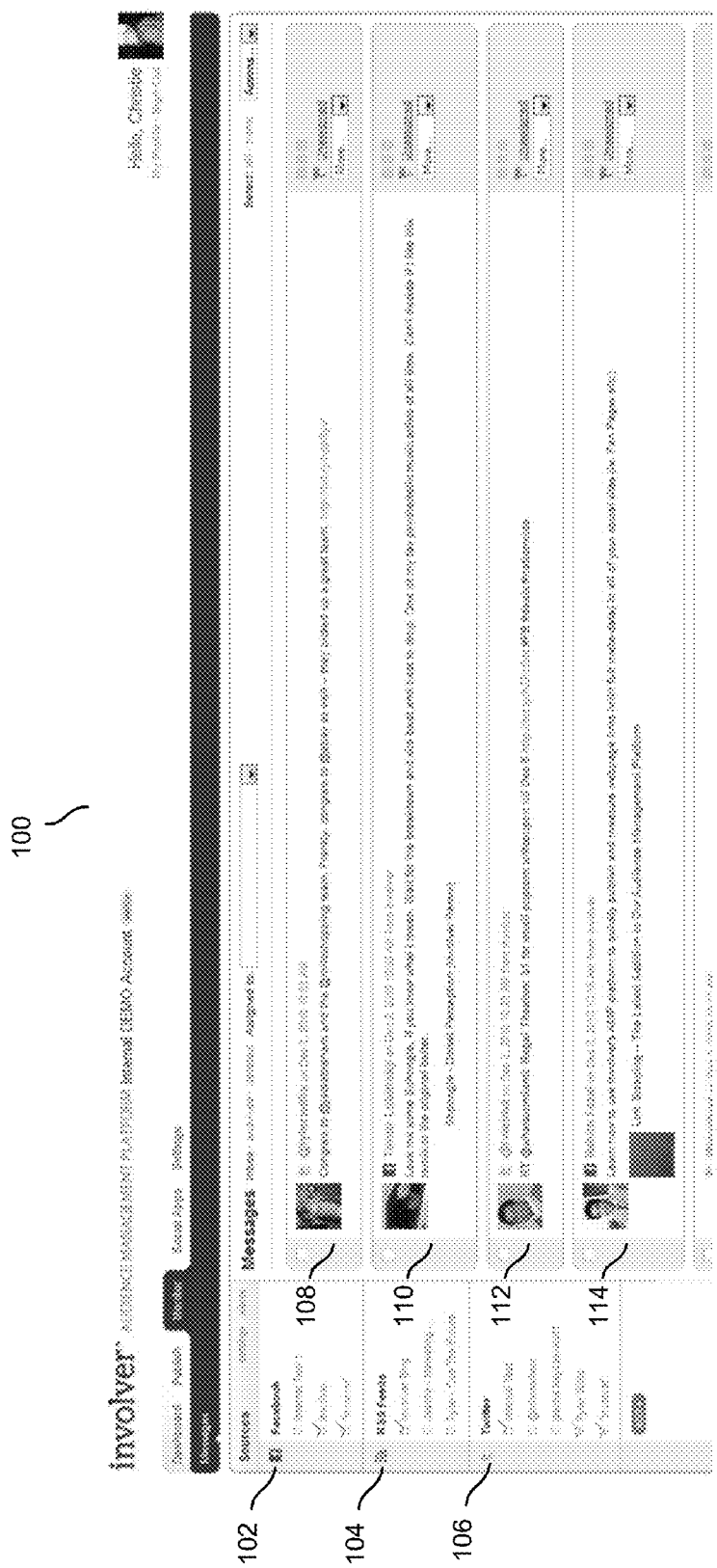
FIG. 1 is a diagram of an embodiment of a central user interface for presenting posted content from various sources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Monitoring posted content across multiple sources in an efficient manner is disclosed herein. Posted content from various sources from one or more platforms is obtained. In various embodiments, posted content from the various sources are presented at a central user interface for monitoring. Multiple users may have access to one account (e.g., the same information) at the interface. The posted content may be monitored to trigger an action to be taken with respect to the posted content. Various embodiments include replying to the posted content, deleting the posted content or assigning the posted content to a user (e.g., by an assigned marketing or public relations employee within a company) who is to take an action with respect to the posted content. Some other embodiments of an action to be taken include assigning a sentiment to the posted content (e.g., using an automated and/or third-party sentiment assignment system), republishing the posted content to an outlet. In some embodiments, past actions regarding the posted content may be accumulated, analyzed and/or viewed (e.g., in the form of an audit trail or a log of previous actions taken).

As used herein, a "platform" may include a website such as a social network or blog or web feed (e.g., Facebook, Twitter, Blogger, RSS, YouTube). In some embodiments, the platform may permit interaction by users or viewers or account holders. As used herein, a "source" may include an account or a channel on a platform. In some embodiments, a source may require authentication before content at the source may be viewed. For example, Facebook requires a person to login to an account and to be a friend of another person before seeing content on that other person's page and anonymous viewing of content is not permitted. As used herein, a "posted content" or "content" or "presented content" or "obtained content" may include one or more comments (e.g., Facebook comment, comment to a blog post, reply to a previous comment) or uploaded postings (e.g., images and associated metadata, text, rich media, URLs) at one or more sources. As described above, content may comprise a variety of forms and/or types. As used herein, a "sentiment" refers to an opinion or feeling associated with a presented content.

In one example application of the technique, brand managers may desire to monitor commentary or conversations on the internet that relate to the brands they manage. Certain sources may contain information or posted commentary that are relevant to brands that a brand manager manages. Some examples include managing the brand or reputation of a recording artist or band, a women's clothing line or a small business (e.g., a bakery, restaurant, etc.). Receiving and presenting all desired content to be monitored at a central interface permits brand managers to efficiently consume and manage the plethora of information across multiple sources from a single interface. If a brand manager desires, he may take an action with respect to a monitored content inline at the central interface, that is, without having to navigate away from the interface in order to take or otherwise perform a desired action. In some embodiments, the result of the action taken with respect to a monitored content may be displayed at the source without the brand managers needing to directly interact with or go to a source (e.g., log into an account associated with the platform of the source and reply to a posted comment at the webpage of the source). Examples of actions include assigning a sentiment, replying to, or deleting the content. In some embodiments, more than one brand manager manages the same brand(s), each may access the central interface as a user and access the same information. Multiple users may utilize the central interface to share the responsibilities regarding the monitoring and management of posted content in an organized and collaborative fashion.

FIG. 1 is a diagram of an embodiment of a central user interface for presenting posted content from various sources. In the example shown, user interface 100 contains content posted at various sources associated with three platforms: Facebook 102, RSS Feeds 104, and Twitter 106. As shown in user interface 100, below each of platforms Facebook 102, RSS Feeds 104, or Twitter 106 are associated sources. For example, "Internal Test 1" and "involver" are sources associated with the Facebook 102, while "Involver Blog" is a source associated with "RSS Feeds."

As shown in this example, posted content at the sources are presented in windows 108, 110, 112, and 114. Window 108 is presenting content (specifically, a Twitter Tweet) from source "@tylerwillis" and window 110 is presenting content (specifically, a Facebook comment) posted at source "involver" by poster "Timur Lubinsky." Each of windows show presents content from a monitored source. As shown in user interface 100, posted content may include text (e.g., a Twitter Tweet in window 108) and/or URL (e.g., the link in window 110 or in window 112). The user interfaces described herein (including user interface 100) are central or single user interfaces. That is, they are user interfaces from which content from a plurality of sources and/or platforms can be viewed (e.g., together or all at once). Similarly, with respect to management and taking an action on one or more of the content, a central or single user interface permits management of and/or processing to be performed on one or more pieces of content from a single or central interface without, for example, having to navigate away to other and/or multiple websites associated with each individual source or individual platform.

In some embodiments, the sources are identified or specified (e.g., by their URL) and then added for monitoring at the central monitoring interface. In some embodiments, users of the central interface are administrators of the sources (e.g., users can access the user account of Internal Test 1 account in the case of Facebook 102 because they are authorized users who know the username and password for Internal Test 1 account). In some embodiments, the sources are available to the public and/or are anonymously accessible (e.g., any member of the public may view content at the source without authentication or providing their identity). In some embodiments, posted content at the monitored sources are obtained (e.g., via the central interface periodically communicating with the API of the platform associated with each source to pull newly posted content).

One example of using user interface 100 is a brand manager who would like to monitor posted content at various sources, which he believes contains relevant information regarding brands that he manages. Sources may include websites at which the brand manager has accounts or websites that are available to the public. Relevant information may include feedback, commentary, postings regarding brands that the brand manager manages or regarding brands of competing brands. By using user interface 100, the brand manager may monitor content posted at multiple sources, across one or more platforms, all at one central user interface, without needing to manually access each source at each platform. If the brand manager desires, he may also perform actions to posted content at the central interface and in some embodiments, the actions would entail content displayed at the sources in appearances that conform to the display configurations of the associated platforms. This way, the brand manager may monitor and even interact with relevant conversations or commentary across the internet efficiently at one central user interface.

Figure 2:
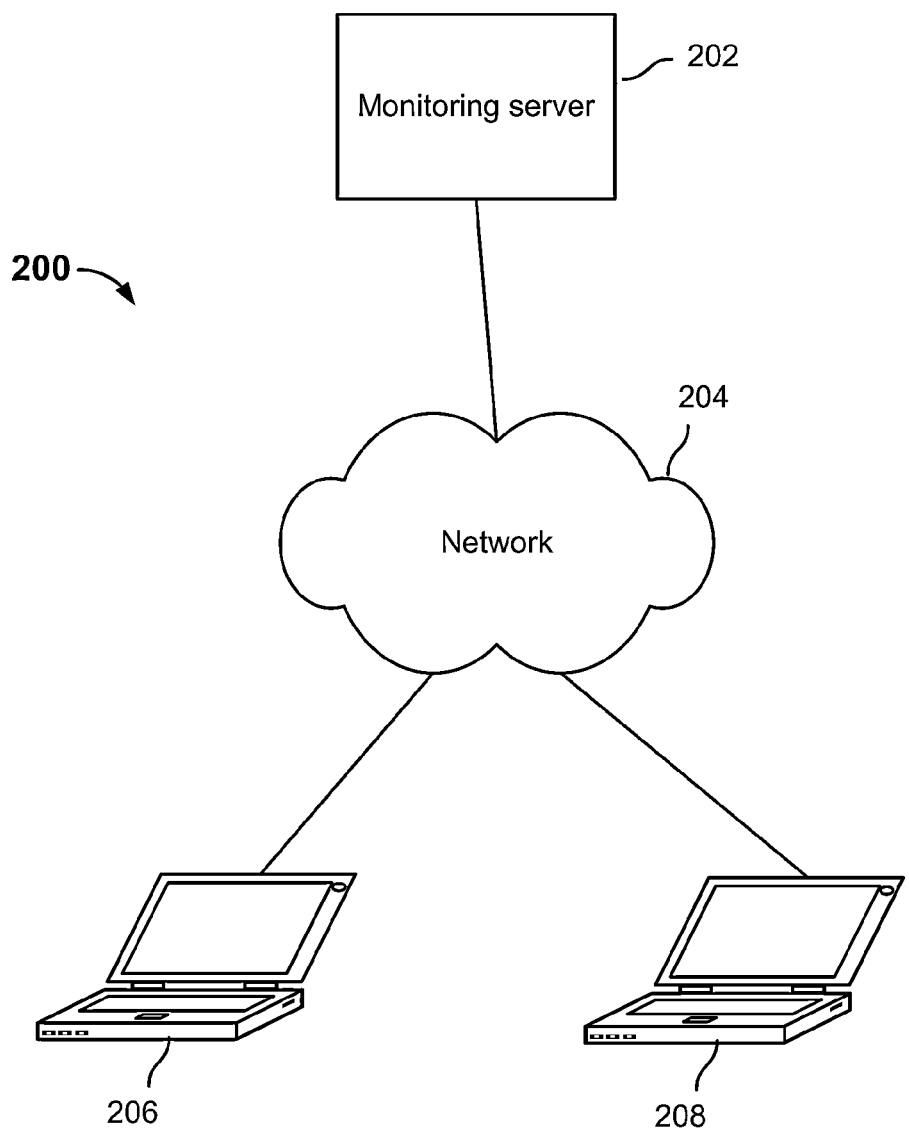
FIG. 2 is a diagram of an embodiment of a system for monitoring content from various sources.

FIG. 2 is a diagram of an embodiment of a system for monitoring content from various sources. In some embodiments, monitoring server 202 may implement user interface 100 of FIG. 1. In the example shown, system 200 comprises of a monitoring server 202, network 204, brand manager 206 and commentator 208.

In some embodiments, monitoring server 202 communicates with brand manager 206 via network 204 to present the content posted at selected sources. For example, the content presented may be feedback or a response by commentator 208 in response to or in reaction to content posted by brand manager 206 (e.g., a brand manager 206 posts an announcement about a sale or promotion and commentator 208 expresses excitement about the sale or promotion). In another example, commentator 208 posts content "out of the blue" that is not necessarily directly tied to or associated with a specific piece of content by brand manager 206, such as a comment, "I love Tummy Rub dog toys!". In various embodiments, network 202 includes various high speed data networks and/or telecommunications networks. Although this figure shows brand manager 206 as communicating via a computer, a variety of devices may be used, including (but not limited to) a Internet browser application or a specialized application running on a smart phone or other device. Monitoring server 202 may be linked to various sources at various platforms (not shown). Links between monitoring server 202 and various sources may be established via, but not limited to, the following examples: a secure authentication service or an exchange of identification information and passwords.

In another example, brand manager 206 manages a brand associated with a line of tennis shoes. In that example, the brand manager may have accounts (e.g., the brand manager may be the administrator of the accounts) at platforms that are dedicated to distributing information regarding the brand's line of tennis shoes. The brand manager may also know about certain webpages that contain relevant information to the brand's line of tennis shoes. For example, other relevant webpages include publicly viewable webpages at one or more platforms, competitors' webpages, blogs with posts that relate to tennis shoes, and webpages that rate new tennis shoes. The brand manager would input information (e.g., identification and/or authentication information) regarding the sources he wishes to monitor at the user interface. The user interface would then obtain content posted at the selected sources and present the content to the brand manager. In some cases, the brand manager may select an action with respect to the presented content at the user interface if he feels that action is warranted. Among the actions that the brand manager may take include replying to a piece of content, deleting a piece of content, assigning a sentiment to the piece of content, assigning the posted content to another user (e.g., a colleague of the brand manager), and republishing the posted content. This way, the brand manager may monitor relevant commentary regarding the brands he manages across various sources associated with different platforms at one location or central/single user interface. The brand manager may also interact with such commentary, keep track of trends related to the commentary, and also coordinate monitoring activities with his colleagues.

Monitoring server 202 obtains content from various sources. In some embodiments, sources are publicly or anonymously viewable websites or webpages (e.g., websites or webpages that do not require authentication or identification for access). In some embodiments, sources require authentication before content may be accessed from them. Monitoring server 202 obtains the content from a source through one or more of the following: pulling the content off the server associated with the source, communicating with the application programming interface ("API") associated with the platform that corresponds to the source, querying the server associated with the source for updated content, or any other appropriate technique. In some embodiments, monitoring server 202 obtains content from the sources periodically. In some embodiments, monitoring server 202 obtains content from the sources whenever it detects a change at the sources (e.g., monitoring server 202 can periodically check the sources for any changes such as newly posted content or updates made to existing content). In some embodiments, monitoring server 202 obtains content from the sources at a request by a user.

Monitoring server 202 provides content from these various sources and/or platforms to brand manager 206 via a user interface. In some embodiments, the user interface may be accessed through one or more accounts, for example where each account is associated with a different person or employee who is involved in the monitoring and/or managing of comments or posts. In one example, the content relates to a band and people associated with the band (e.g., the manager or agent of the band), the band's record company (e.g., the band's contact or manager at the record company) or other music industry professionals (e.g., publicists) each have an account and may access the content from the various sources using the user interface by logging in using their respective accounts and accessing the user interface. In some embodiments, each account at the user interface may be accessed by one or more users (e.g., there may be more than one publicist working on the account and all publicists use the same publicists' account).

Monitoring server 202 may receive an action to be taken with respect to one or more posted content. In some embodiments, monitoring server 202 may perform the specified action and present a result of the action. In various embodiments, the action is selected and inputted into the user interface by a user. In some embodiments, the received action entails receiving text to be published at the source (e.g., a response to a posted content such as "Thanks! We're glad you love our products!" in response to the comment "I love Tummy Rub dog toys!") and publishing the received text at the source. The received text may appear at the user interface and may be grouped with the display of the original post so that brand manager 206 knows that the action has been taken and the content on which the action was performed. In some embodiments, a posted content may be deleted and such a deletion is reflected at the source (e.g., commentator 206 posted a negative and/or inappropriate comment such as "Tummy Rub dog toys suck." on the Facebook account of Tummy Rub dog toys; deletion via the user interface is performed at the user interface as well as on the Facebook account of Tummy Rub dog toys). In some embodiments, a reply to or a deletion of a posted content is only possible at the user interface if the user is also an administrator of the source at which the action is to be performed (e.g., continuing the example above, the person doing the deletion has the username and password of the Tummy Rub Facebook account and thus has ability or authorization to delete content on the Tummy Rub Facebook account). In some embodiments, monitoring server 202 performs a reply or deletion by communicating with the API of the platform with which the source is associated.

Besides replying to or deleting posted content, monitoring server 202 may receive instructions to perform other actions and perform such actions on the (selected) content. Other actions include assigning or selecting a sentiment for a piece of posted content, assignment a posted content to a user, republishing the posted content, filtering the obtained posted content based on selected keywords, among others. More information regarding the actions is disclosed below.

Monitoring server 202 may also store historical information regarding posted content. In some embodiments, historical information may include the time when each piece of content was posted, with which source and platform the content is associated, whether an action with respect to the content has been performed, to which user the posted content was assigned, among other information. In some embodiments, monitoring server 202 may store historical information and/or group the stored information based on, for example, the related platform, assigned user, date/time, and action that is associated with the content.

Brand manager 206 communicates with monitoring server 202 over network 204 to select sources to monitor, view the content posted at the sources, and perform actions with respect to the posted content. Brand manager 206 may communicate with the monitoring server via a computing device or mobile device (e.g., smart phone or tablet). In some embodiments, monitoring server 202 adjusts the display of content depending on the type of device that brand manager 206 uses. For example, different viewing devices (e.g., devices from which the central interface may be accessed) may entail different sizes of displays. So, monitoring server 202 will adjust the display content to the appropriate format of whichever display size is used on the viewing device (e.g., monitoring server 202 may detect the type of device used through its access of the central interface). In some embodiments, brand manager 206 may provide information to monitoring server 202 via a user interface, such as user interface 100. In some embodiments, a brand manager or other user accesses an account on such a user interface by accessing a website (e.g., www.involver.com) and entering security or verification information (e.g., a user name, password, stored token, etc.). In some embodiments, other users besides brand manager 206 may access and utilize the user interface. In some embodiments, brand manager 206 may select at least one source to monitor through the user interface (not shown). Brand manager 206 consumes the posted content obtained from the selected source(s) via a presentation of the obtained content by the user interface. In some embodiments, brand manager 206 may select an action with respect to a presented content at the user interface.

Figure 3:
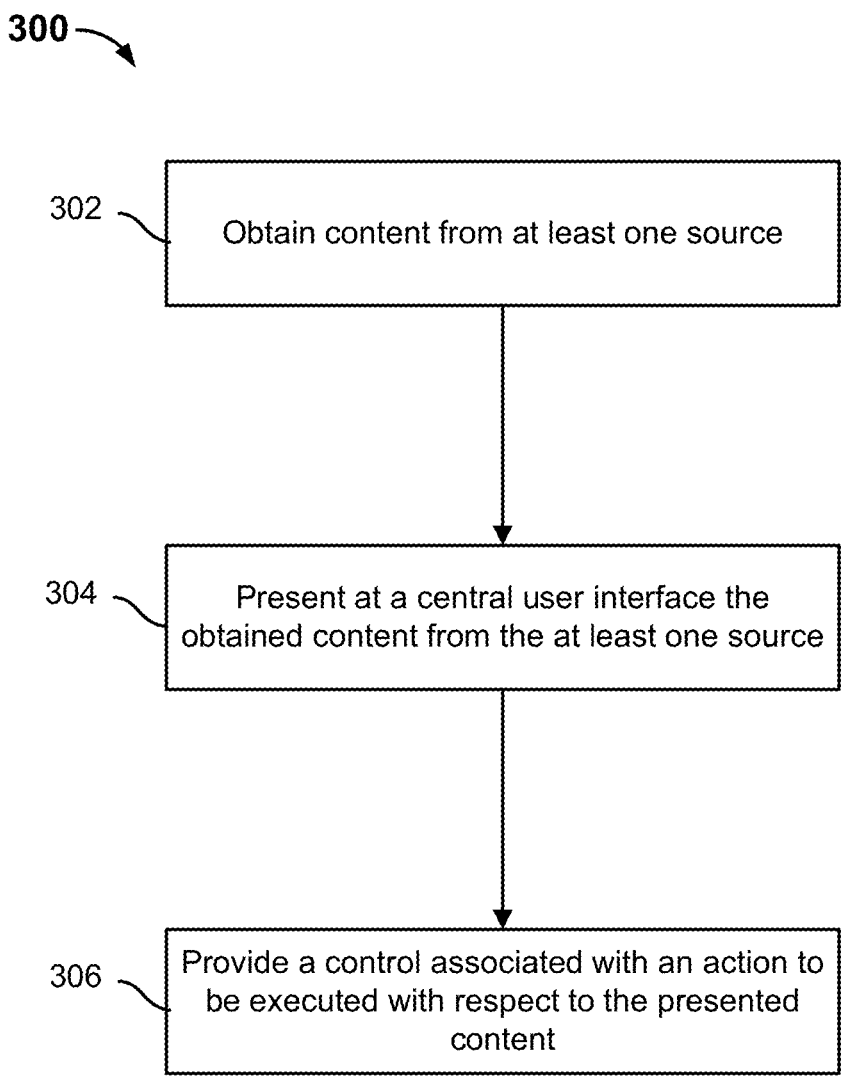
FIG. 3 is a flowchart illustrating an embodiment of a process for monitoring sources.

FIG. 3 is a flowchart illustrating an embodiment of a process for monitoring sources. In some embodiments, process 300 is performed by monitoring server 202 of FIG. 2. At step 302, content is obtained from at least one source. In some embodiments, one or more sources are identified by a user (such as a brand manager) and the identification information and any applicable authentication information is entered into a central user interface provided by a monitoring server (e.g., specifying that the source is associated with the Twitter account for Tummy Rub Dog Toys and providing the password for that account). The sources for which content is obtained may be associated with one or more platforms. For example, the process may obtain content associated with the Facebook platform (e.g., comments in response to a post on the Tummy Rub Dog Toys page on Facebook) as well as tweets directed to or flagging Tummy Rub Dog Toys on Twitter. In some embodiments, the monitoring server will obtain content by: pulling the content off the server associated with the source, communicating with an API associated with the platform that corresponds to the source, querying a server associated with the source for updated content, or any other appropriate technique. In some embodiments, content is obtained from the source(s) either periodically or at the request of a user. In some embodiments, the obtained content is stored at the monitoring server. The obtained content may be stored with relevant metadata (e.g., associated assignment to a specific user, time of posting, associated source's URL, associated platform, etc.).

In step 304, the obtained content from the at least one source is presented at a central user interface. The display shown in user interface 100 of FIG. 1 shows one such embodiment of this. In some embodiments, the obtained content may be displayed in chronological or reverse chronological order at the user interface. In some embodiments, the display at the user interface may be refreshed periodically or in response to the obtainment of newly posted content at the sources. In some embodiments, the obtained content is displayed at the user interface in accordance with the display configurations or requirements or selected sorting of the user interface (e.g., sort from oldest to newest, sort from newest to oldest, sort based on platform, sort based on prioritization, display based on a whether an action has been assigned or not, display content associated with selected type(s) of actions assigned to the content, show only content assigned to specified user(s), display only unfinished actions, a selected sorting based on creation time of a content, an algorithmically-computed importance of the content, a user to whom the content is assigned, a algorithmically-computed importance of a creator of the content, whether media is attached, or a sentiment assigned to the content etc.). In some embodiments, in the event that identifying information for a commentator who posted some content is available, such information is also displayed with the posted content at the user interface.

In step 306, a control associated with an action to be executed with respect to the presented content is provided. In some embodiments, the control may be an interactive area of the user interface (e.g., a clickable button, a pull down menu, radio buttons, input box, a selectable icon, etc.) that a user may select or click or choose in some manner specifying and action to be assigned or taken with that content and any related parameters, controls or specifications (e.g., if the action is to assign the content to someone, the parameter may be the assignee). Some examples of controls and associated actions are shown in FIG. 1 and in other figures herein. In the event that a provided control is selected (e.g., by clicking on a button or selecting from a pull down menu), an indication of a selected control is received at the user interface presented by the monitoring server. In various embodiments, in response to receiving the indication, the monitoring server performs at least a portion of the action associated with the selected control.

A control is associated with an action and the action is to be executed for a presented content from at least once source. As mentioned above, some actions (e.g., replying to or deleting) to be executed with respect to a presented content may entail a corresponding update at the sources. Some actions (e.g., assigning a content to another user of the user interface) entail sending a notification to another user. Some actions (e.g., republishing content) entail publishing content at a selected outlet in which publication privileges are available. Some actions (e.g., assigning or selecting sentiment for a piece of content) entail selecting appropriate metadata (e.g., in the case of a binary sentiment, whether the sentiment is positive or negative) and storing that metadata at the user interface with the presented content. Further details regarding actions are described below.

The following figures show in more detail some features regarding monitoring sources across one or more platforms, some features which have been already been discussed and some features which have yet to be mentioned.

Figure 4:
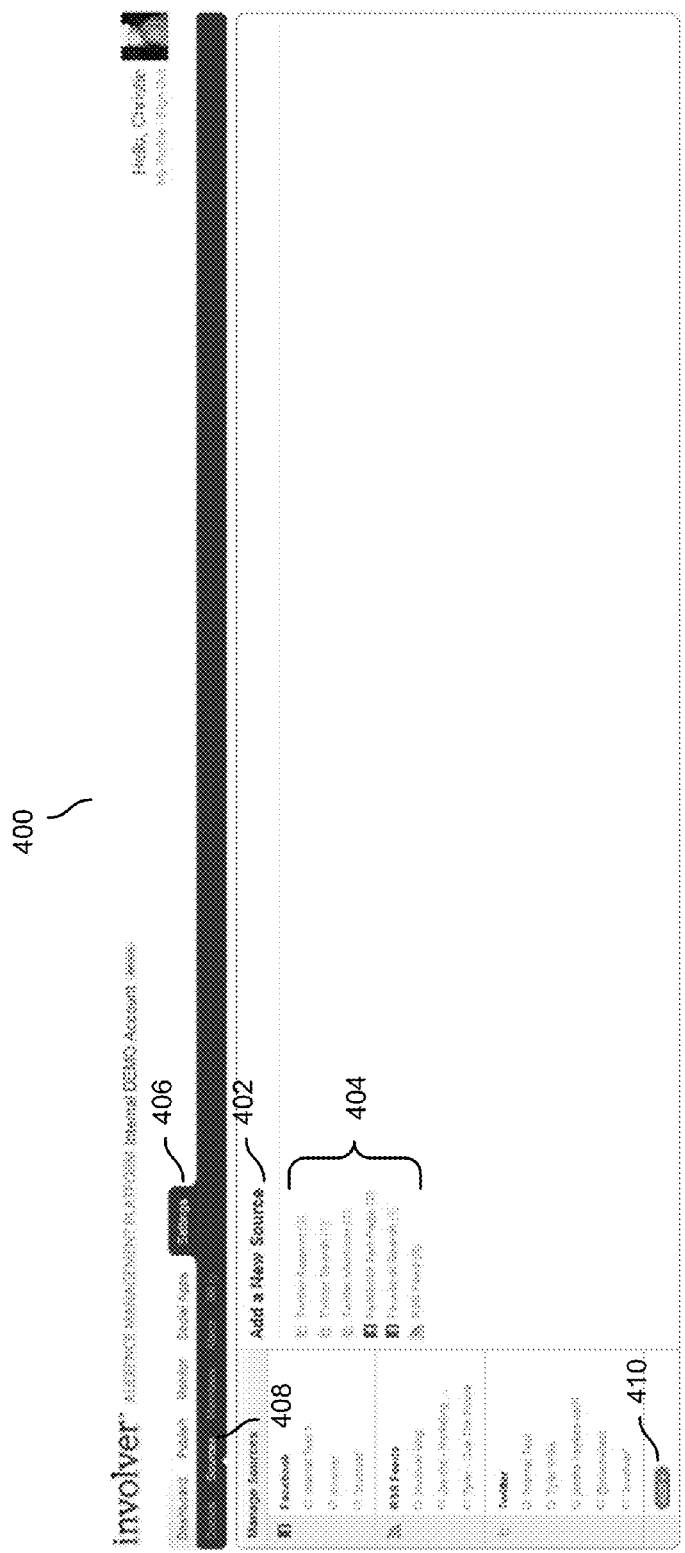
FIG. 4 is a diagram showing an embodiment of a user interface for adding a source to be monitored.

FIG. 4 is a diagram showing an embodiment of a user interface for adding a source to be monitored. In the example shown, user interface 400 appears in response to selecting "Settings" tab 406 of a user interface such as user interface 100 of FIG. 1 and selecting "Sources" link 408 and also selecting "ADD+" button 410. As shown in user interface 400, sources may be added under "Add a New Source" 402. Sources may be monitored if they are publicly viewable or are administered or owned by a user of user interface 400. In section 404, the added sources (i.e., the sources that are currently being monitored through user interface 400) are shown and grouped with their associated platforms and sub-categories of the platform (e.g., Twitter Search is a sub-category of the Twitter platform and Facebook Fan Page is sub-category of the Facebook platform). To add a new source, a user may select a type of platform and sub-category among section 404 that belongs in the same platform (and associated sub-category) as the new source that the user would like to add for monitoring. After selecting the appropriate platform and sub-category, the user may enter identifying information (e.g., URL of the desired source or a user name) and any necessary authentication information (e.g., stored token, login name, and password) in corresponding fields (not shown).

Figure 5:
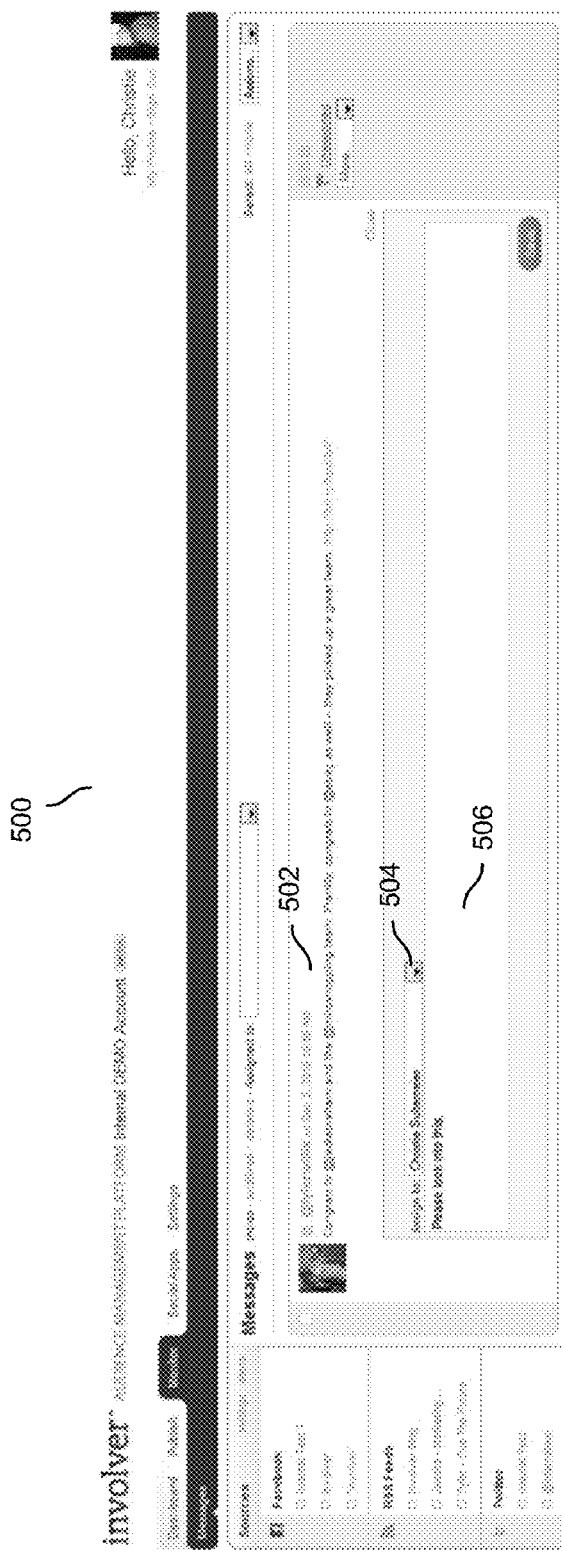
FIG. 5 is a diagram showing an embodiment of a user interface for assigning posted content to a user.

FIG. 5 is a diagram showing an embodiment of a user interface for assigning posted content to a user. In some embodiments, user interface 500 is presented in response to a user indicating an assignment is to be made (not shown). As shown in the example, presented content 502 is assigned based at least in part on the "Assign to" pull down menu 504 and any text (optional) provided via input box 506. "Assign to" 504 is a pull down menu that contains a list of users that have access to user interface 500. In the example shown, the user who is to receive the assignment is "Christie Sultemeier." Input window 506 may be used for entering notes that the assigning user wishes for the assigned user to see with the assignment of the presented content. In some embodiments, the result of successfully assigning content to a user is that the assigned user will receive an alert or some other form of notification (e.g., an email) regarding the assignment. The alert or notification may include the content and the accompanying notes submitted by the assigning user. Also, the assignment to a specific user feature may assist in organizing workflow among multiple users of the same user interface (e.g., users of the same account at the user interface).

Returning to the former example of the brand manager who wishes to monitor posted content at various sources, the brand manager may use the assignment feature as exemplified in FIG. 5 to assign tasks to other colleagues who also have access to the user interface. For example, the brand manager may come across content from a source that is presented at the user interface and discover that the content contains language that may potentially entail undesirable legal liability for the brand manager and the brands he manages. Thus, the brand manager can assign the relevant content to another user (e.g., an in-house attorney at the company of the brand manager) with more legal knowledge to review and possibly take action with respect to the content (e.g., delete the posted content). Also, the brand manager may include notes addressing his concerns (e.g., such as in input window 506) with the assignment to inform the assigned user reasons for this assignments, points of interest, etc. In another example, the comment is related to a bug in software and the comment is assigned to a software developer or software tester. As another example of the use of the assignment feature is to spread the responsibility of monitoring a potentially large amount of incoming content among several members of a team. For example, for positive comments that simply require a thank you or acknowledgement, the comment may be assigned to a pool of interns. In some cases, they all use the same account (e.g., an intern account) or have individual accounts (e.g., in their own name).

Figure 6A:
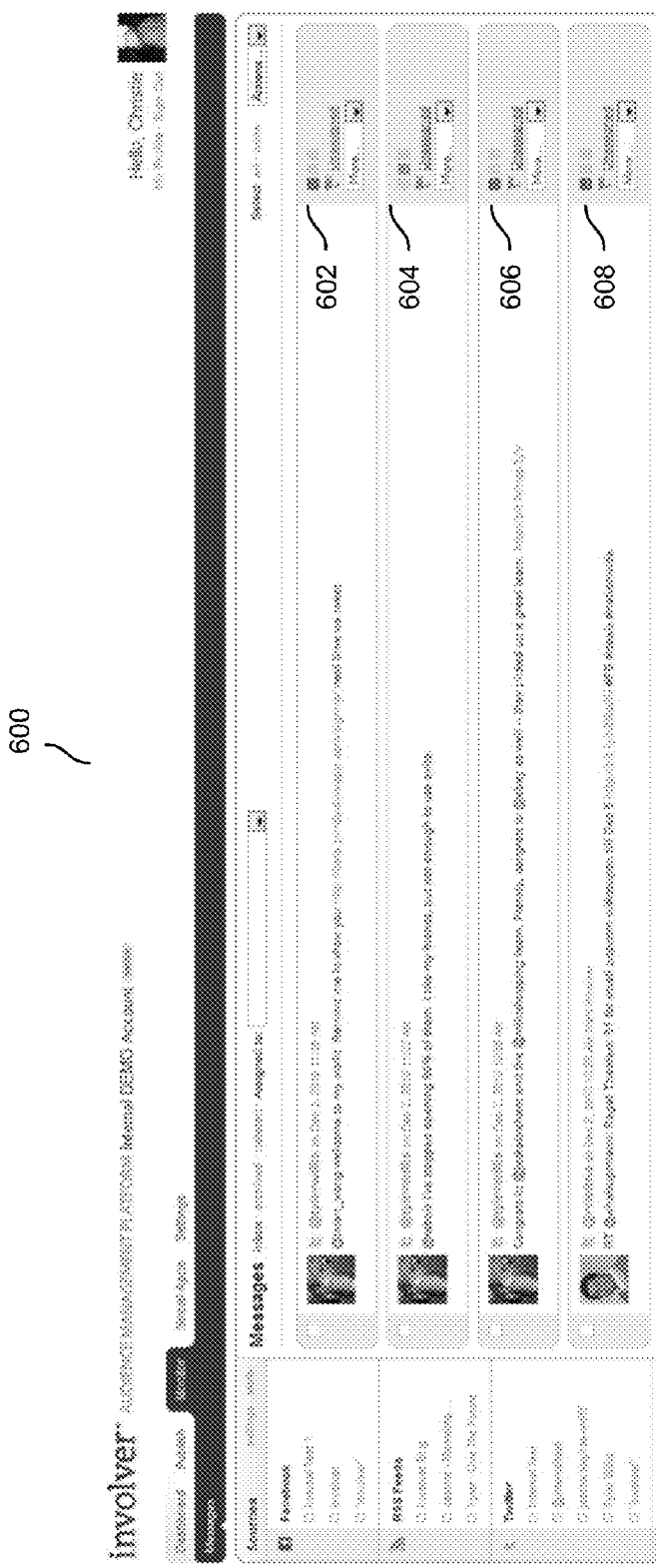
FIG. 6A is a diagram showing an embodiment of a user interface associated with assignment of sentiment to presented content.

FIG. 6A is a diagram showing an embodiment of a user interface associated with assignment of sentiment to presented content. In the example shown, selectable areas 602, 604, 606, and 608 of user interface 600 each feature three sentiment icons. The left sentiment icon (selected in 602, 606 and 608) denotes a generally positive sentiment associated with the corresponding presented content. The middle sentiment icon (selected by 604) denotes a neutral sentiment and the right icon denotes a generally negative sentiment. In some cases (not shown) none of the three sentiments is selected and the associated content has no assigned sentiment. While only three sentiments are shown in the example of FIG. 6A, any number of sentiments may be used and/or axis of sentiment may be used (e.g., silly, hostile, confused, questioning, etc.). In some embodiments, a user interface permits at most one sentiment may be selected for the corresponding content. In some embodiments, assigned sentiments are tracked over time so that the history or progression of sentiment can be analyzed for trends (e.g., content at a particular source for a product is consistently positively received after the time at which a favorable review of the product is posted). One such embodiment of a plot of sentiment over time is shown in FIG. 6B.

As shown in this example, a sentiment for a presented content may be manually assigned via a user interface by a user of the user interface. In some embodiments, a sentiment for a presented content is automatically assigned (i.e., assignment of sentiment is not done manually by users of the user interface). In some embodiment, the sentiment may be automatically assigned by a third party service (e.g., CrowdFlower) which may communicate with a server associated with user interface 500 to assign sentiment to the presented content. In some embodiments, a third party may assign sentiment based on automatic detection of certain keywords, natural language processing or any other appropriate technique.

Figure 6B:
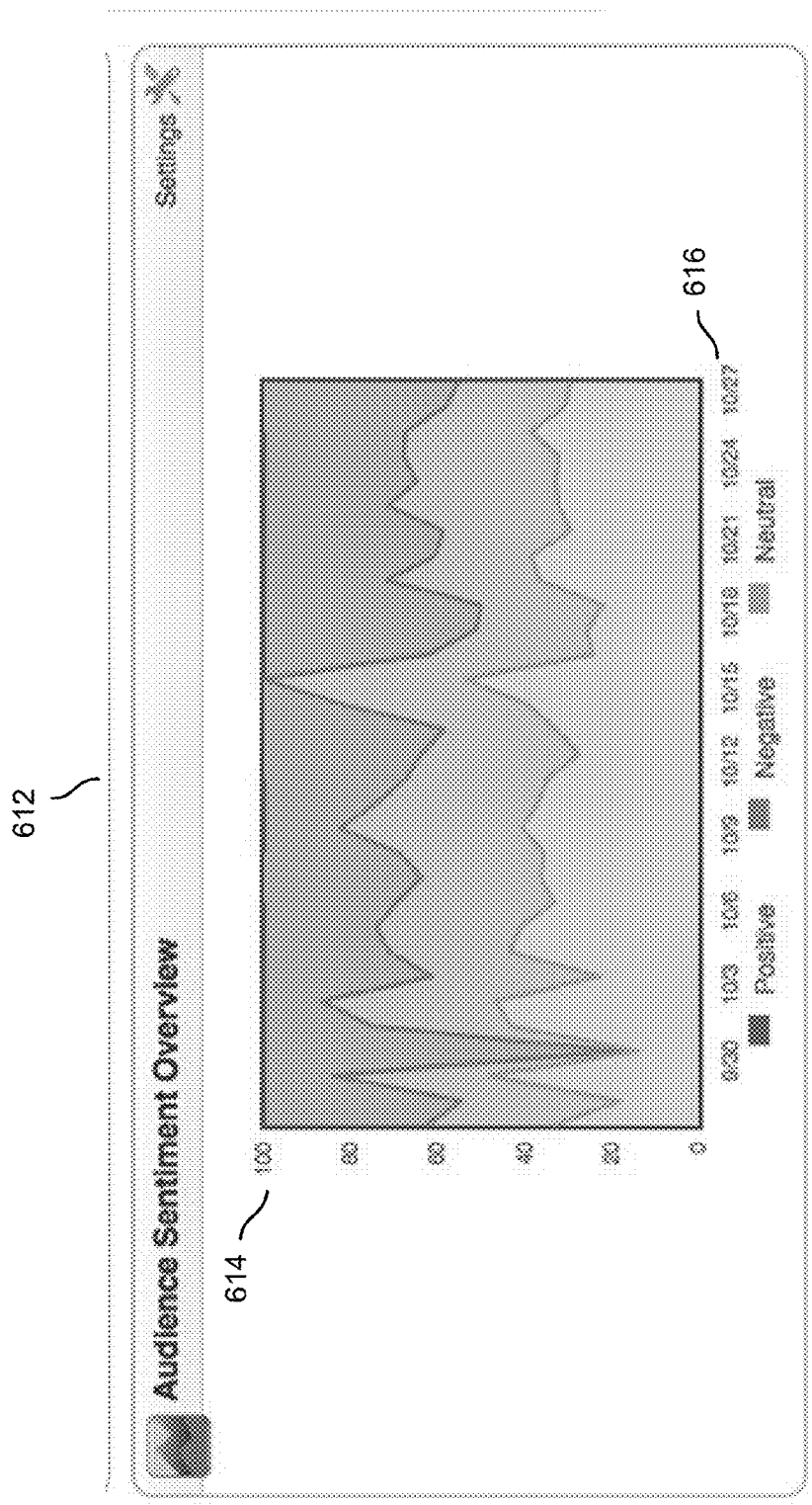
FIG. 6B is a diagram showing an embodiment of a plot of a sentiment graph over time for a monitored source.

FIG. 6B is a diagram showing an embodiment of a plot of a sentiment graph over time for a monitored source. In the example shown, plot 612 includes two axes; vertical axis 614 includes the percent of positive, negative or neutral sentiments assigned to content posted at a certain monitored source and horizontal axis 616 shows a timeline that spans dates September 30 to October 27. In various embodiments, sentiment plots or graphs such as plot 612 may be generated by a user interface for presenting content from various sources such as such user interface 100. The parameters such as the relevant source and the relevant period of time (not shown) for the sentiment plots or graphs to be generated may be selected by a user of the user interface.

Figure 7:
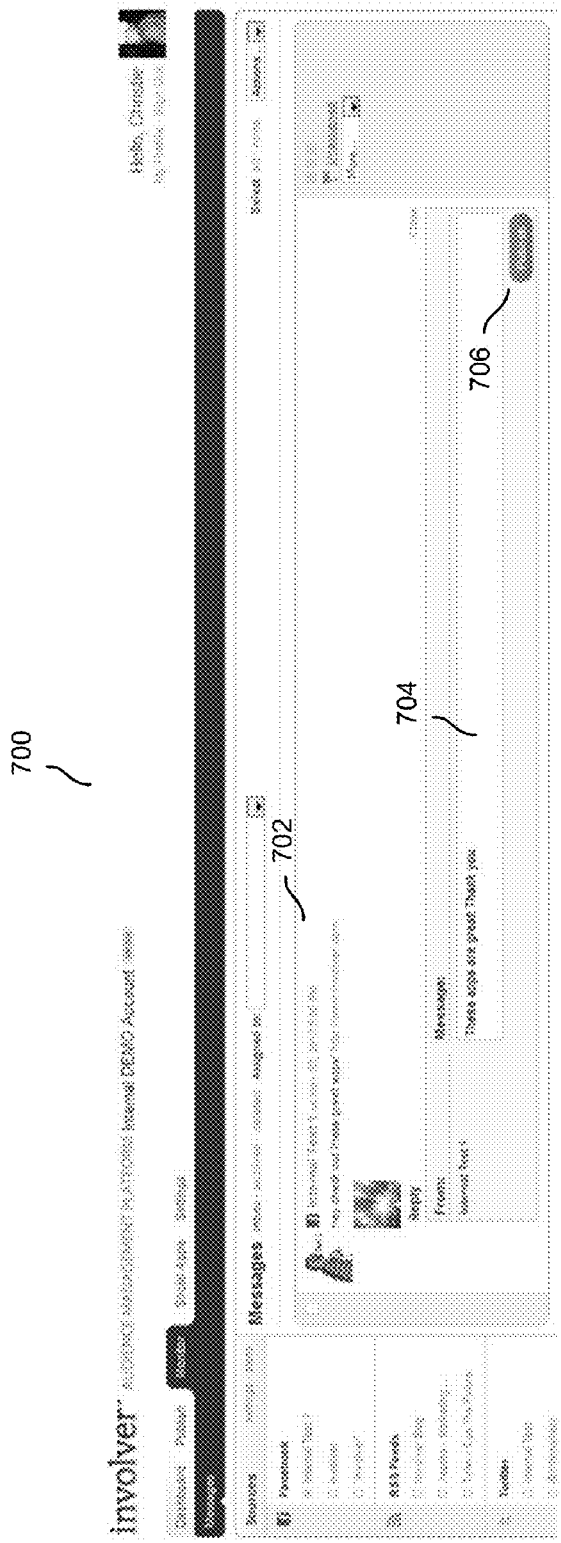
FIG. 7 is a diagram of an embodiment of a user interface where an action applied to a presented content is to reply to the presented content.

FIG. 7 is a diagram of an embodiment of a user interface where an action applied to a presented content is to reply to the presented content. User interface 700 is presented in response to a selection of replying to (e.g., post a responsive/relevant comment to) a specific piece content (e.g., Facebook post and or comment to Facebook post) presented for a selected source. In the example shown, a reply message is to be made to presented content 702. In some embodiments, a user may only reply to content posted at/obtained from sources of which a user is an administrator (e.g., sources for which the user or another user of the same account at the user interface has authentication information). In other words, in some embodiments, users may not reply to content posted at/obtained from sources of which they are not administrators (e.g., sources for which the user or any other user of the same account at the user interface do not have authentication information). In some embodiments, only users of certain privileges, authorizations, or roles may reply to a presented content.

A user may input a reply to a presented content at user interface 700 inside reply box 704. In some embodiments, a user may input any message including text, images, rich media, and links in reply box 704. One example of a situation when a user might desire to reply to a posted content may be to engage in a conversation with the poster of the content and any subsequent posters to the same chain of comments. When the user finishes entering the desired reply in reply box 704, he may select "Publish" button 706 to post the entered reply.

In various embodiments, in response to the user selecting a "Publish" button, the monitoring server will display the reply comment with the originally presented content. In various embodiments, the reply comment will also be displayed at the source in conformity with the display configuration or requirements associated with the platform at the source. In some embodiments, the monitoring server will communicate with a publication server to publish a reply comment at the source. In some embodiments, the publication server includes a publication module for each platform that is associated with a source of which a user is an administrator. For example, the publication server may have a Facebook publication module, a Twitter publication module, etc. A publication module in some embodiments receives authentication information (e.g., from the monitoring server or via a prompt to a user) and establishes communication with the source to perform authentication as needed. Each platform publication module then communicates with the API of the corresponding platform, translates the reply comment to accommodate the specific features and requirements of the platform, and instructs the platform's API's to publish the reply comment at the relevant source. Examples of translating the reply comment may include, but is not limited to, the following: creating a separate webpage at which the attached image is displayed (e.g., for the Twitter platform where a link to an image is provided as opposed to displaying the image itself in a tweet) and including the link to the separate page in the reply comment, applying font stylizations to the text of the reply comment, arranging the location of an image and its associated metadata (e.g., the image is always placed on the left in a published display with its associated metadata). In one example, a reply to a comment made in Facebook results in calling the Facebook publication module to communicate with Facebook's API.

Figure 8:
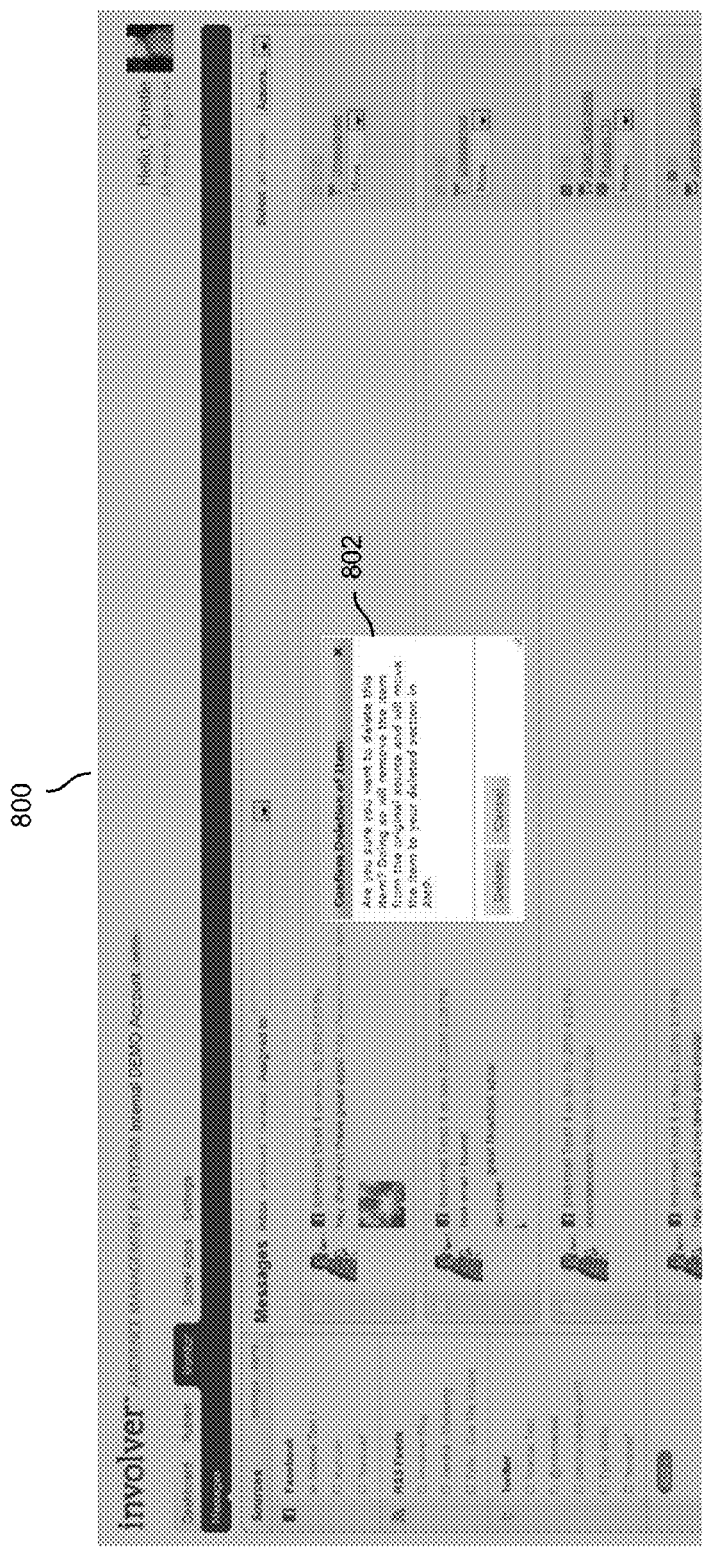
FIG. 8 is a diagram of an embodiment of a user interface presented in response to an action to delete a presented content from its source.

FIG. 8 is a diagram of an embodiment of a user interface presented in response to an action to delete a presented content from its source. In some embodiments, a user of the user interface selects a control to delete some selected content from the source. Similar to the reply feature, in some embodiments, a user may only delete content posted at/obtained from sources of which a user is an administrator (e.g., sources for which the user or another user of the same account at the user interface has authentication information). In other words, in some embodiments, users may not delete content posted at/obtained from sources of which they are not administrators (e.g., sources for which the user or any other user of the same account at the user interface does not have authentication information). In some embodiments, only users of certain privileges, authorizations, or roles may delete a presented content. In some embodiments, deleted content may still be viewed at the user interface. This may, for example, be desirable for tracking or auditing reasons.

To delete a posted content, the "Delete" button in prompt 802 is selected. Upon selecting "Delete" in prompt 802, the user interface (at least in this example) stores the now deleted content with metadata indicating that it has been deleted from the source. Also in response to selecting "Delete" in prompt 802, the monitoring server may communicate with the publication server which then calls the relevant publication module of the platform associated with the source at which the deletion is to take place (e.g., the Twitter publication module or the Facebook publication module). The relevant platform publication module then communicates with the API of the relevant platform to delete the posted content. In some embodiments, a publication server, when obtaining posted content to be deleted, obtains some identifier or link for that content which is used to delete that piece of content. For example, if the content to be deleted is "Tummy Rub dog toys suck" on a Facebook page, when that piece of content is obtained to be displayed in user interface 800, the publication server or underlying publication module obtains and stores an identifier used by the Facebook platform to identify that post. Selecting the "Tummy Rub dog toys suck" Facebook post to be deleted causes the stored identifier associated with that post to be retrieved and passed to the Facebook API via the Facebook publication module.

Figure 9:
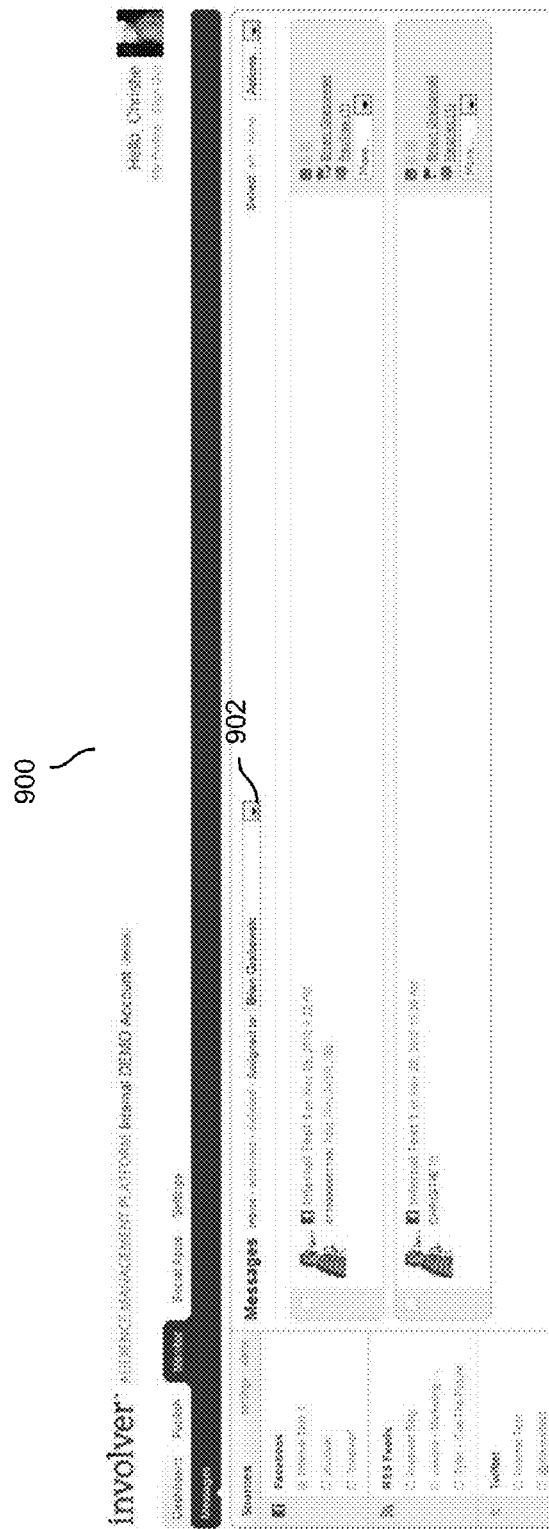
FIG. 9 is a diagram of an embodiment of a user interface for viewing content assigned to a selected user.

FIG. 9 is a diagram of an embodiment of a user interface for viewing content assigned to a selected user. In the example shown, user interface 900 includes pull down menu 902 that contains a list of (all) names of users of the user interface. Pull down 902 allows a user to select a name to see which, if any, content is assigned to the user with that name. In the example shown, the name "Brian Grabowski" is selected and all the content assigned to that user (i.e., two different posts at the same Facebook source) is displayed. In some embodiments, assignment of content is performed as described in the example of FIG. 5.

As shown in this example, user interface 900 permits a user to select or otherwise control the sources associated with the displayed content. In this particular example, only the source Internal Test 1 on the Facebook platform is selected and therefore only content associated with Internal Test 1 which is assigned to the user "Brian Grabowski" is displayed. Similarly, a user may specify a state or status to control what is displayed. In this example, "Inbox" is selected. Other states or statuses which may be selected include archived and deleted.

Figure 10:
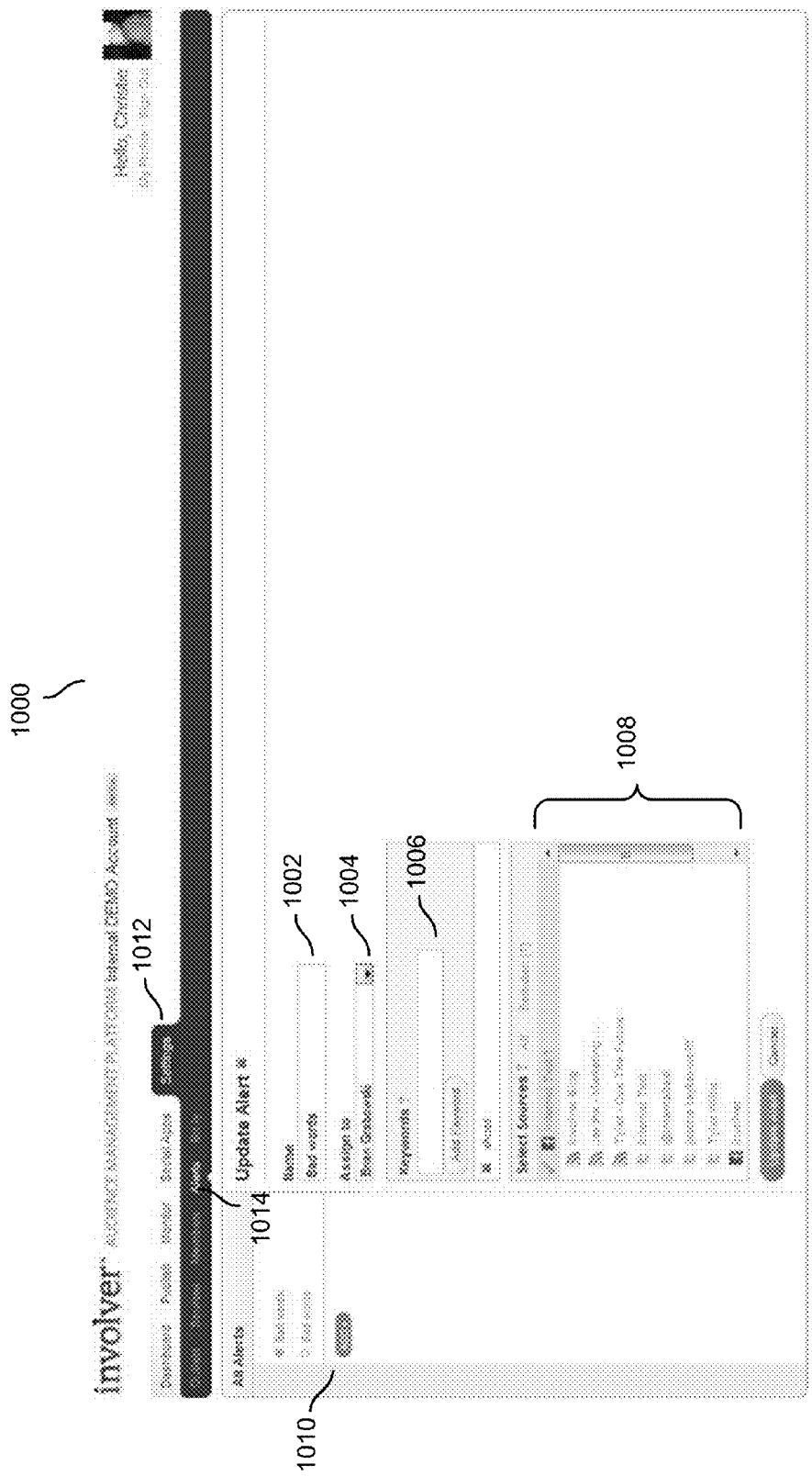
FIG. 10 is a diagram of an embodiment of a user interface for adding keyword alerts for the content obtained from the selected sources.

FIG. 10 is a diagram of an embodiment of a user interface for adding keyword alerts for the content obtained from the selected sources. In some embodiments, setting an alert as shown herein as associated with or a more advanced feature of assigning content to a user. Put another way, it is a way of automatically assigning content from one or more sources to a specified user. In the example shown, user interface 1000 appears in response to selecting "Settings" tab 1012 of a user interface such as user interface 100 of FIG. 1 and selecting "Alerts" link 1014 and also "ADD+" button 1010. Setting up a keyword alert on content obtained from one or more sources allows users to apply a keyword filtering when assigning content obtained from the selected sources. When obtained content contains one of the designated keywords, a specified user (in this case, Brian Grabowski) may be easily assigned such content. In some embodiments, a notification to the user may comprise of an email including the relevant content and its associated source information.

As shown in the example of FIG. 10, a keyword alert may be set up using the interactive fields 1002, 1004, 1006, and 1008. In name field 1002, a user may create a name for the filter. In the example shown in user interface 1000, the name selected for the keyword alert is "Bad words." In "Assign to" pull down menu 1004, the user may select the name of a user to whom the content is assigned when content containing the keywords specified in "Keywords" field 1006 is obtained at one or more of the sources selected from the "Selected Sources" menu 1008. One or more keywords alerts may be created and/or edited via user interface 1000.

One advantage to setting up a keyword alert is to apply some form of intelligent filtering of incoming content from the selected sources. This is particularly attractive when there is large volume of content where manual review or processing is difficult or impossible. For example, a really popular band or product may have a very large number of Twitter tweets or Facebook posts related to them. Such filtering may enable that the more pertinent content (i.e., content including a keyword or keywords) to be automatically identified and assigned to a user.

Returning to the former example of the brand manager who wishes to monitor posted content at various sources, the brand manager may set up keyword alerts so that he may be notified of notable situations. For example, the brand manager may set up a keyword alert for monitored sources of which he is also an administrator to detect response to the brand manager's posted promotional material (e.g., search for the name of a newly-launched product). The brand manager may also set up a keyword alert related to a competitor (e.g., to search for the name of the competitor or to search for specific keywords on a source owned or managed by the competitor). In another example, the brand manager may set up a keyword alert for any sources to detect any content that could incur undesirable legal liability.

In some embodiments, the frequency at which notifications (e.g., an email) are sent may be specified. For example a notification may be sent once a day or once a week as desired. In response to receiving a notification, the assigned user (e.g., Brian Grabowski) may access the user interface and deal with the assigned content appropriately (e.g., by responding to the content, by deleting the content, etc.).

In some embodiments, a list of content assigned to a user is prioritized and (if desired) subsequently limited (at least temporarily where lower priority content may be accessed if desired, for example using a user interface button for "More" or "Low Priority Assignments") to a certain number or those having a certain level of importance or priority. In cases where there is a significant amount of content to be reviewed and/or managed, prioritizing and/or limiting content presented to a user may be useful since it enables the person to whom the content is assigned to better prioritize or manage their responsibilities, for example to that assigned content identified by the system to be of the highest priority. In some embodiments, the user interface is configured to display to a user such a prioritized and/or restricted list. In some embodiments, a notification (e.g., an email) generated by a user interface is configured to present to a user such a prioritized and/or restricted list. In some embodiments, a user interface assigns importance based on how an item of content came to be assigned to a person. In some embodiments, when content is assigned manually by a person, that piece of content has higher priority than another piece of content assigned automatically (e.g., based on keyword matching). In some embodiments, if manual assignment occurs, the level of importance is based on the status or role of a person (e.g., an assignment by a person with the role of Admin has lower importance compared an assignment by a person with a role of Moderator) or the identity of the person (e.g., an assignment by the CEO of a company has the highest importance). In some embodiments, when manual assignment is performed, an assignor has the ability to set one or more levels of importance (e.g., High versus Low importance, an importance level of 1-5, etc.). In some embodiments, a user interface is able to be configured so that how a user interface prioritizes assigned content when generating a prioritized and/or limited list may be adjusted as desired).

In some embodiments, a keyword alert may include another action to be performed on the obtained content that contains the keywords besides automatic assignment to a user. For example, in user interface 1000, in place of "Assign to" field 1004, another action may be entered in the field or chosen from a menu of possible actions. The action may include assigning a sentiment, replying to, deleting the content or republishing, for example. That way user interface 1000 may be modified to become a keyword filter that automatically performs any selected action on keywords that are detected in obtained content. For example, user interface 1000 may set up a keyword filter that detects certain foul language (e.g., configured as the keywords) and automatically delete (e.g., as the selected action) the obtained content among which the foul language was detected.

Figure 11:
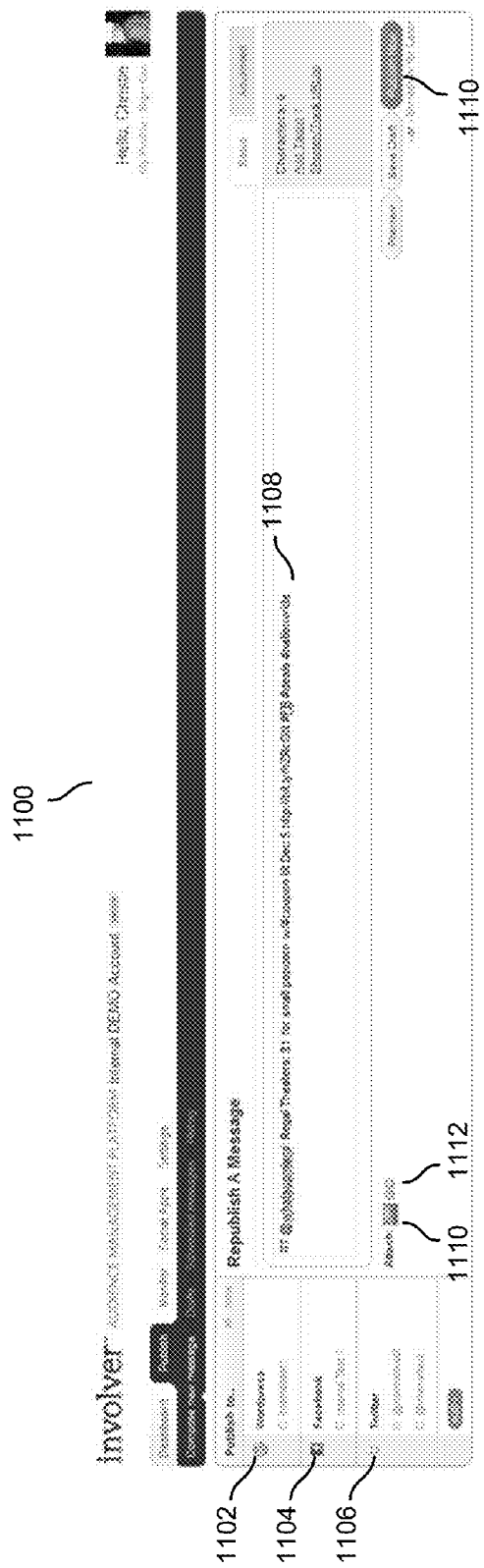
FIG. 11 is a diagram of an embodiment of a user interface for republishing content obtained from a source.

FIG. 11 is a diagram of an embodiment of a user interface for republishing content obtained from a source. In the example shown, user interface 1100 appears in response to selecting a control (e.g., a button or a selection among a pull down menu) associated with the republication of content obtained from one or more sources. In the example shown, the content that was first obtained from a monitored source is automatically copied into editing window 1108. In some embodiments, the content is copied into an editing window by the monitoring server. The copied content may include text, images, rich media, and/or links. The copied content may also be edited or added to in editing window 1108. In some embodiments, a user may attach an image and/or a link to the copied content. One advantage to republishing content obtained from a monitored source is to generate more posts at a webpage that a user maintains.

In one example, a pet store announces a sale on Tummy Rub dog toys via the store's publically accessible Facebook account. A user (such as a brand manager) wants to repost this on the Twitter and Facebook pages of the Tummy Rub company. User interface 1110, obtains the original post and includes it in editing window 1108. The user can add to the content, for example by adding the text "Tummy Rub dog toys on sale at Fog City Pet Store!" and/or tags to the republished message. In the example shown in this figure, tags include #FB, #deals and #nationwide.

The copied and possibly edited content in editing window 1108 may be published to one or more outlets associated with one or more platforms. Unlike replying to content as exemplified in FIG. 7, republishing content entails publishing at an outlet which is different than the source from which the content was obtained. In replying to content, the reply is published at the source from which the content was obtained. However, content obtained from one source may be republished to another source if the other source is an outlet. An outlet is an account at a platform (e.g., Facebook, Twitter, etc). In order to publish at an outlet, a user must be an administrator at the outlet (e.g., the user must have or have access to authentication information regarding the outlet). In contrast, a user may monitor any source of which he is an administrator or any source that is available to the public (e.g., no authentication is required to view the webpage).

In some embodiments, when content is to be republished, a monitoring server associated with user interface 1100 communicates to a publication server. The publication server is linked to the outlets to which a user desires to republish or publish content. Links between the publication server and various outlets may be established via, but not limited to, the following examples: a secure authentication service or an exchange of identification information and passwords. Regardless of the method of linking the publication server and various outlets, the result of the linking is that the publication server has the ability to publish content at the various outlets. In some embodiments, the publication server comprises of one publication module for each platform supported. The publication server receives the content to be republished and the selection of outlets to which the content is to be republished. Each platform publication module retrieves the authentication information for its respective selected outlets (e.g., from a storage of outlet authentication information) and establishes communication with each of the outlets to perform authentication as needed. Each platform publication module then communicates with the API of the corresponding platform, translates the content to be republished to accommodate the specific features and requirements of the platform, and instructs the platform's API's to publish the content. Examples of translating the content may include, but is not limited to, the following: creating a separate webpage at which the attached image is displayed and including the link to the separate page in the content, applying font stylizations to the text of the content, arranging the location of an image and its associated metadata (e.g., the image is always placed on the left in a published display with its associated metadata).

As shown in the example of FIG. 11, platforms 1102, 1104, and 1106 (e.g., Wordpress, Facebook, and Twitter, respectively) are platforms at which content may be published. Outlets at which content may be published are listed below each respective platform. A user may select one or more outlets, across one or more platforms at which the copied (and edited) content within editing window 1108 may be published. The user may select "Publish now" button 1114 to publish the content at the selected outlets within editing window 1108 and any attached link or image via the technique described above. The underlying publication modules will take care of any necessary processing as required by the specific rules or layout formats of the various platforms.

Figure 12:
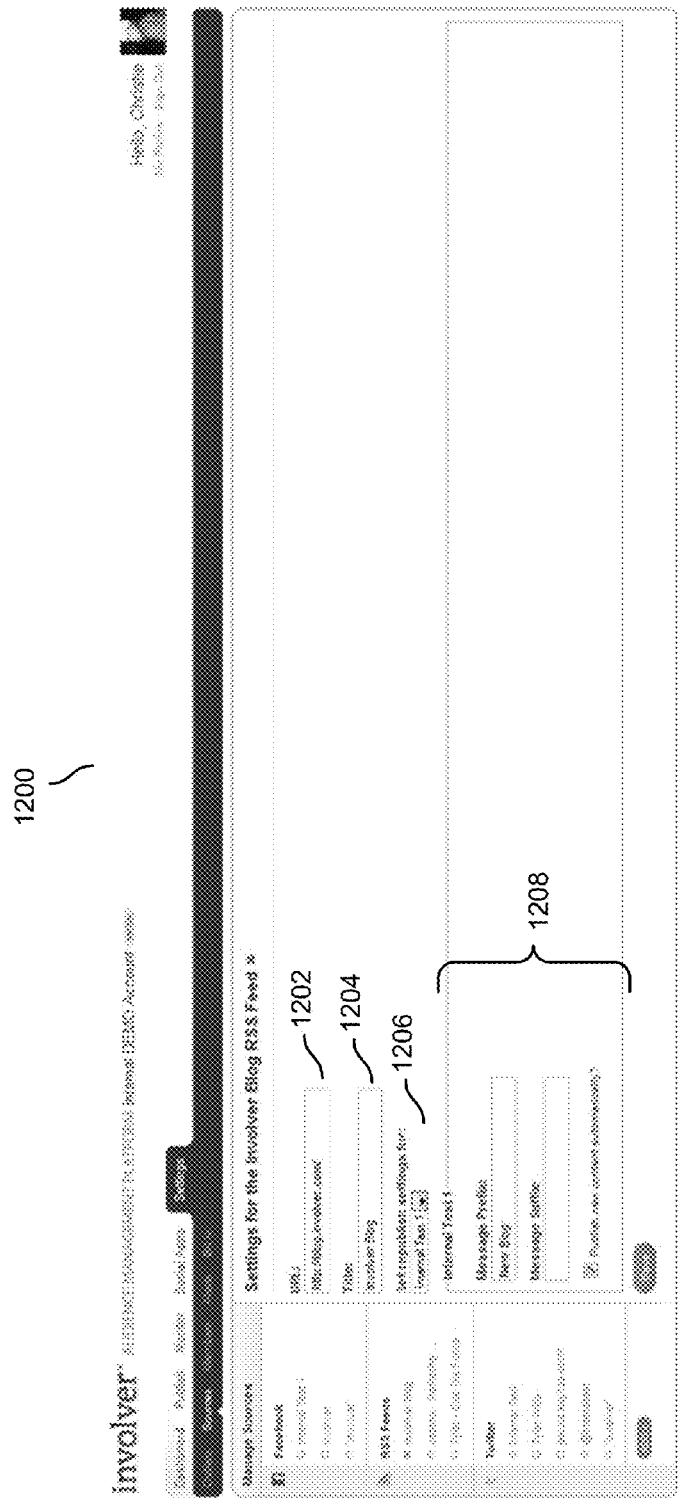
FIG. 12 is a diagram of an embodiment of a user interface for automatically republishing content obtained from monitored sources.

FIG. 12 is a diagram of an embodiment of a user interface for automatically republishing content obtained from monitored sources. Similar to the concept of manually republishing content as exemplified in FIG. 11, a user may also setup automatic republication of content. In the example shown, user interface 1200 appears in response to selecting a control (e.g., a button or a selection among a pull down menu) associated with the republication of content obtained from one or more sources. In the example shown, user interface 1200 provides interactive fields 1202, 1204, 1206, and 1208 for which a user may use to setup automatic republication of content. In "URL:" field 1202, the user may enter the URL associated with a source (e.g., http://blog.involver.com) whose content the user desires to republish. In "Title:" filed 1204, the user may enter a title (e.g., "Involver Blog") of his choosing that identifies the source. In some embodiments, the user may also select a source on the left side of the user interface and its relevant URL and title information will be populated into fields 1202 and 1204. Pull down menu 1206 contains a list of all the outlets at which a user may republish to. After selecting an outlet from pull down menu 1206, the user may fill in customized "Prefix" and/or "Suffix" information (e.g., hash tags) for the selected outlet in section 1208. Also, the user may select the "Publish new content automatically?" box so that the republication of content obtained from the source as identified by the information of the 1202 and 1204 input boxes may be automatically republished at the selected outlet. In some embodiments, all the content posted at the source is republished at the selected outlet. In some embodiments, automatic republication is performed by the same technique (e.g., via a publication server and platform publication modules) that is used for manual republication, only that automatic republication takes place without a request to republish as is required for manual republication.

Returning to the former example of a brand manager, the brand manager may use either manual republishing (one embodiment of which is shown in FIG. 11) or automatic republishing (one embodiment of which is shown in FIG. 12) to regularly update a website (i.e., an outlet) that he maintains. For example, the brand manager may maintain an interactive website (e.g., a Facebook Fan Page) in which he posts information regarding a new line of tennis shoes that is produced by a brand that the brand manager manages. One of the goals of the brand manager is to promote consistent activity on the website so that viewers have more incentive to frequently return to the website. By republishing content from another source onto the website, the brand manager may benefit from the ease of generating information, without needing to create original material. Also, the brand manager may also use republishing to easily reference and reproduce content from a source that contains relevant information (e.g., a positive review of the new line of tennis shoes posted by an influential blogger).

Figure 13:
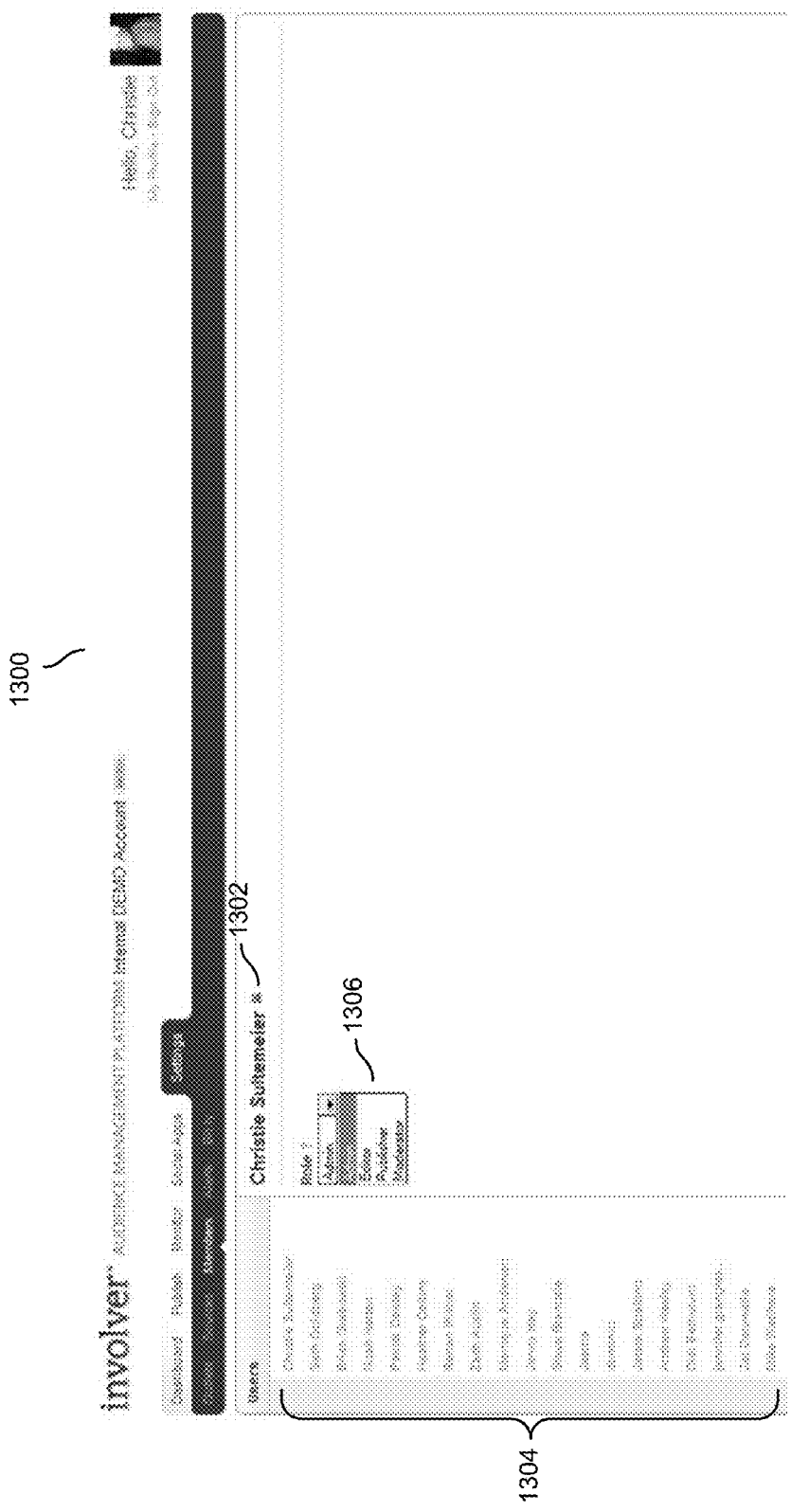
FIG. 13 is a diagram of an embodiment of a user interface for editing a role assigned to a user of an account.

FIG. 13 is a diagram of an embodiment of a user interface for editing a role assigned to a user of an account. In this example, each user who has access to the user interface described herein has an assigned role. In this example the roles include Admin, Editor, Publisher and Moderator. Each role may entail different privileges. Privileges include which actions (e.g., replying to, deleting content, republishing content, etc.) a role has authorization to take or perform. For example, a user with the role of Admin may be limited to review content and assigning it to another user but may not necessarily be able to reply to or delete any presented content. In the example shown, the user Christie Sultemeier is selected in section 1302 and her role is specified using pull down menu 1306. Multiple users may be assigned the same role and content in some embodiments is assigned to a role (as opposed to a specific person). One advantage to this is to divide responsibilities among a team of people who are working on monitoring the same one or more sources. For example, if one person is busy or out of the office, the other people having the same role can perform the necessary action (e.g., responding, deleting, etc.).

In some embodiments, when a user first accesses a user interface, the user interface or an underlying server determines a role for that user and which actions are permitted for that user and/or role. In some embodiments, controls associated with actions that are not permitted are "grayed out" or otherwise made inaccessible to that user to prevent that user from taking those actions. For example, if Christie Sultemeier in interface 1300 is assigned a role of "Admin" and that role is only permitted to view content and assign it to another user (but not delete or respond to content) then controls associated with deleting and responding may not be activated for Christie.

Figure 14:
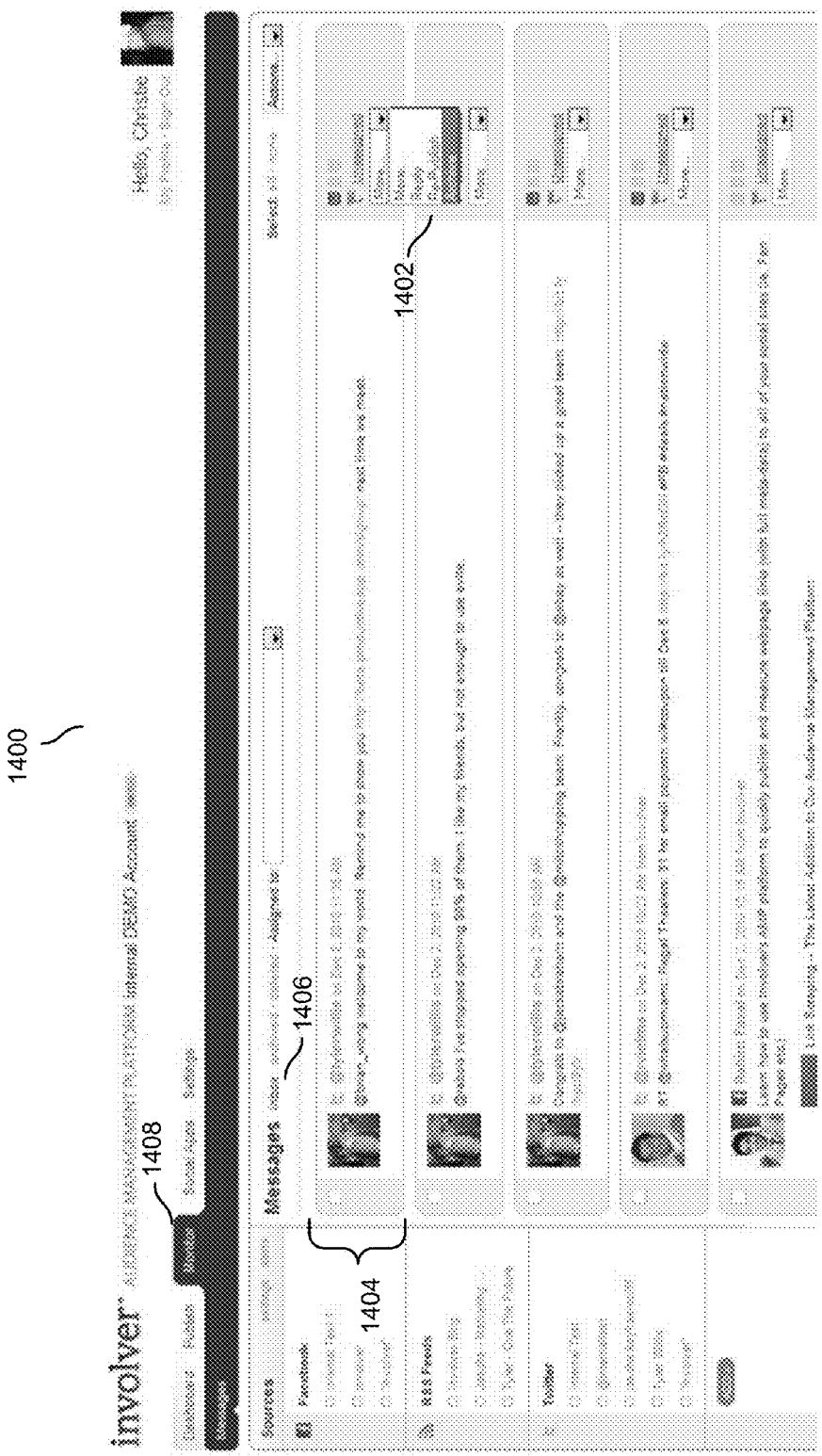
FIG. 14 is a diagram of an embodiment of a user interface for archiving content.

FIG. 14 is a diagram of an embodiment of a user interface for archiving content. In the example shown, user interface 1400 is shown in response to a selection of "Monitor" tab 1408 and a selection of "Inbox" 1406. In some embodiments, user interface 1400 is the default appearance of a presentation of multiple pieces of content obtained from the selected (alternatively, all) sources. In this example, to archive content 1404, the "Archive" option is selected from pull down menu 1402. In response to receiving the "Archive" selection, the user interface will update itself so that the archived content will be hidden from view (not shown). In this example, archived content is not deleted and actions may still be taken with respect to that piece of content. All archived content may still be viewed and/or accessed in the "Archived" display (see FIG. 15). In some embodiments, the user may archive multiple pieces of content at once. A user may desire to archive content so that he may better view and/or manage the remaining content presented in the Inbox display and not be distracted by content that he has already reviewed.

Figure 15:
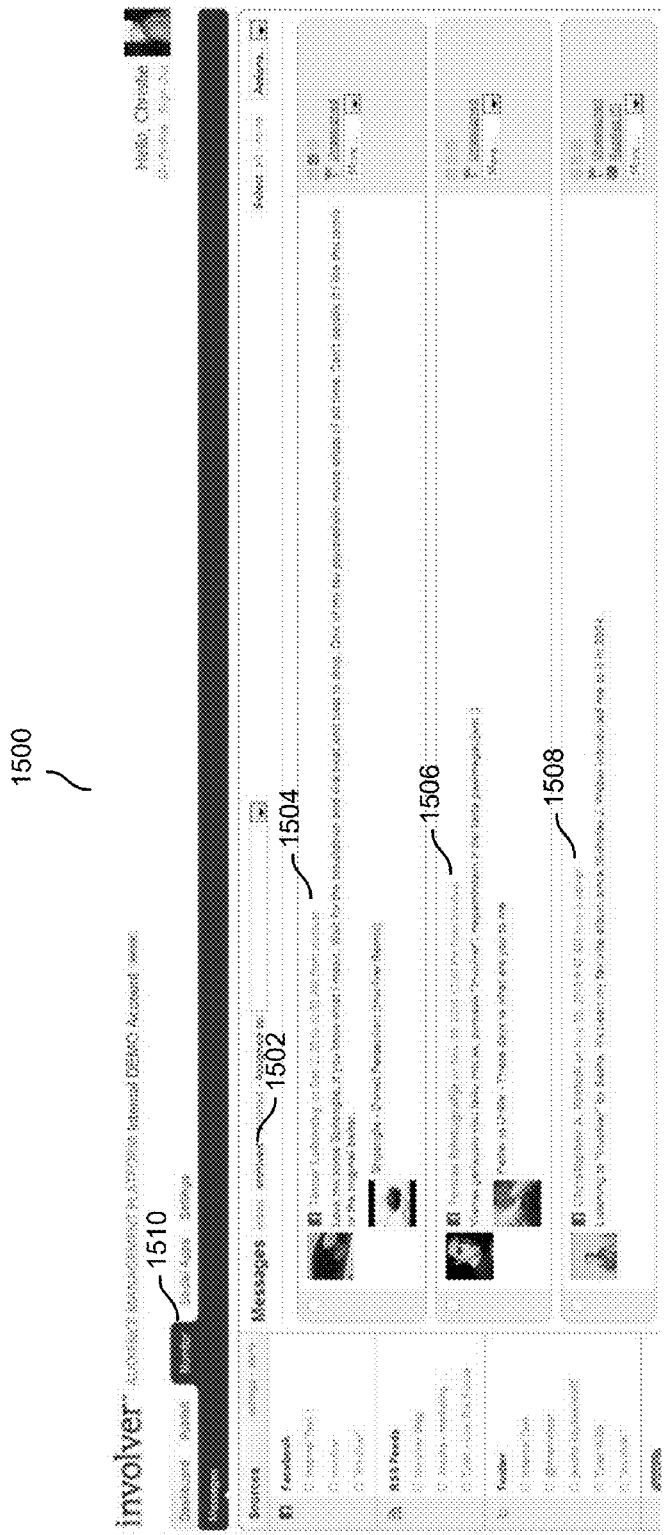
FIG. 15 is a diagram of an embodiment of a user interface for viewing archived content.

FIG. 15 is a diagram of an embodiment of a user interface for viewing archived content. In the example shown, user interface 1500 is shown in response to a selection of "Monitor" tab 1510 and a selection of "archived" 1502. In response to selecting tabs 1510 and 1502, content that has been archived (e.g., using the technique shown in FIG. 14) is displayed. For example, content 1504, 1506, and 1508 were previously archived and are presented in the display shown. In this example, one or more actions (e.g., reply to, delete, republish, etc.) may still be performed with respect to the archived content just as they can be performed with respect to the non-archived content.

Figure 16:
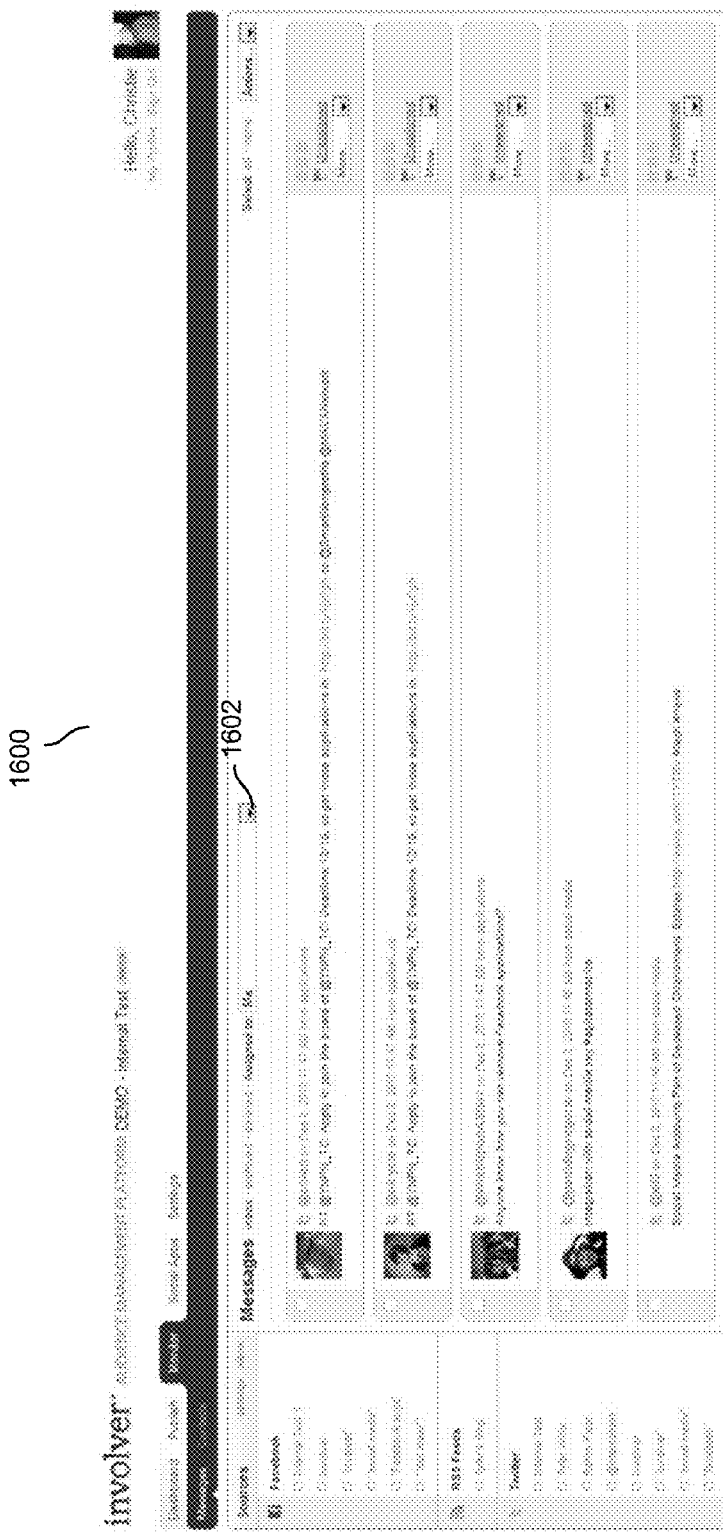
FIG. 16 is a diagram of an embodiment of a user interface for viewing the content assigned to a selected user.

FIG. 16 is a diagram of an embodiment of a user interface for viewing the content assigned to a selected user. In the example shown, user interface 1600 is shown in response to the selection of "Me" in "Assigned to" pull down menu 1602. In some embodiments, a "Assigned to" menu contains a list of users who have access to the user interface. By selecting a name in a "Assigned to" menu 1602, the subsequent display of content is filtered to only contain content that is assigned to the user of the selected name. In the example shown, user interface 1600 is being utilized by a specific user and so the selection of "Me" in "Assigned to" pull down menu 1602 refers to that specific user. "Assigned to" pull down menu 1602 may also include the names of the other users.

Figure 17:
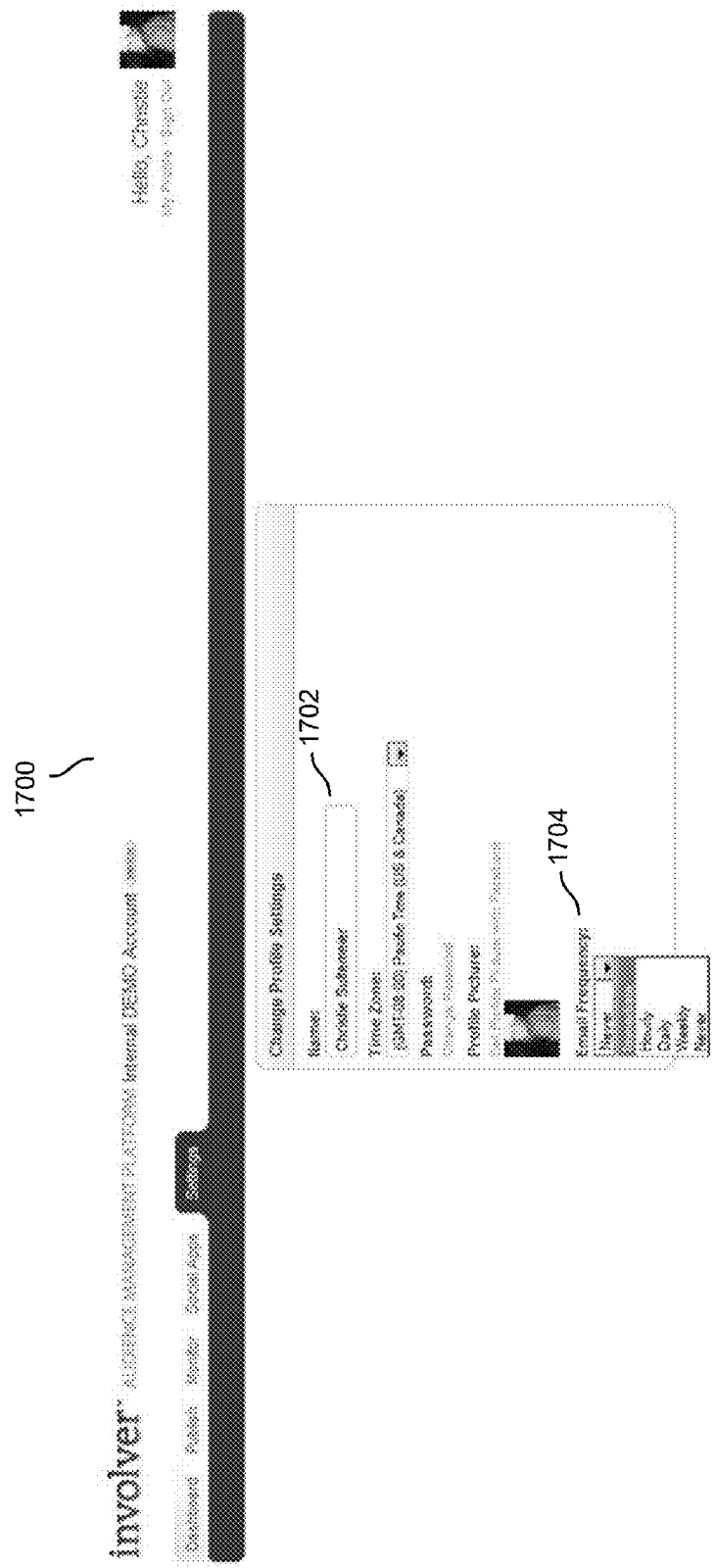
FIG. 17 is a diagram of an embodiment of a user interface for specifying settings associated with an alert notification.

FIG. 17 is a diagram of an embodiment of a user interface for specifying settings associated with an alert notification. In some embodiments, a user may receive a notification (e.g., an email, text message, etc.) letting the user know content has been assigned to them, either automatically (e.g., by searching content for specified keywords) or manually (e.g., by another user who reads a piece of content and decides to assign the content to a particular user). In the example shown, a frequency setting for the user Christie Sutlemeier (1702) is set in this example. Via pull down menu 1704, the email frequency for a user is set to never, immediate, hourly, daily, weekly or never. This way, the user may control receiving relevant email at a pace that is suited to him or her.

In some embodiments, settings associated with a particular role are able to be specified. For example, content may be assigned to a role (as opposed to a specific person) and a notification frequency for a specific role (e.g., a frequency for the role of Editor) may be specified using a user interface similar to that shown herein.

Figure 18:
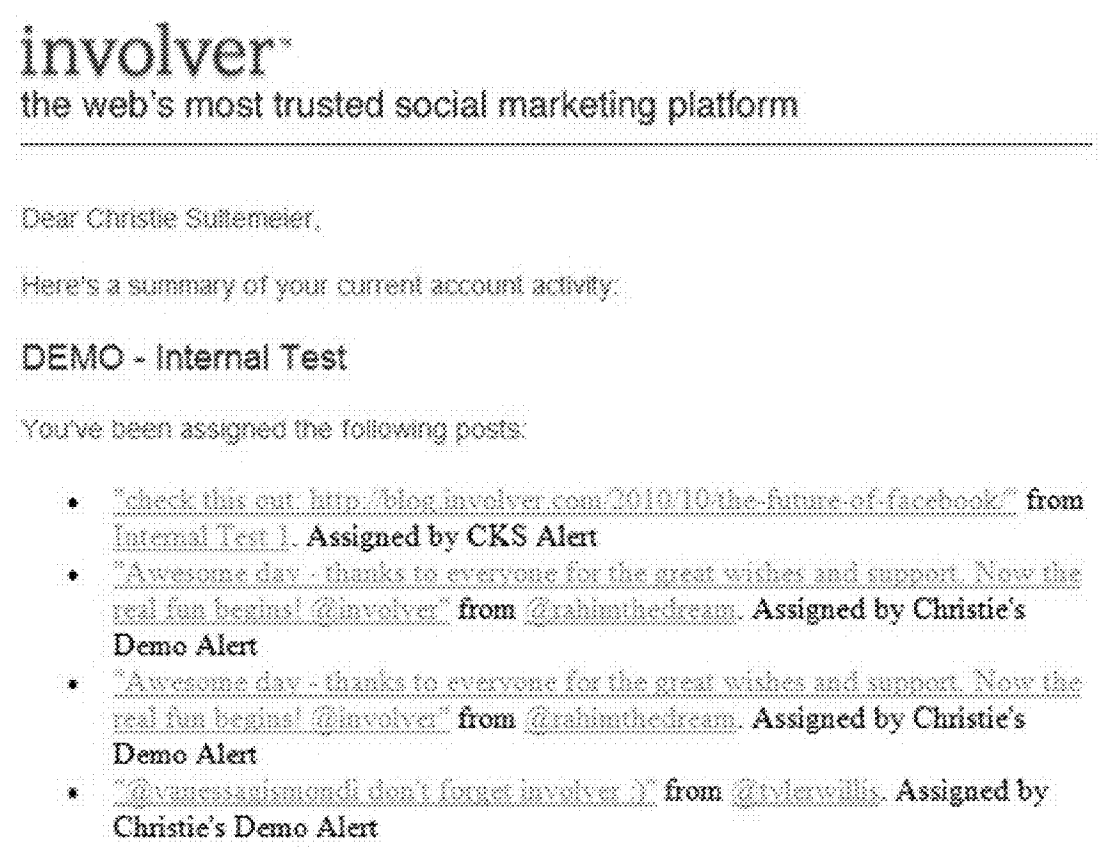

FIG. 18 is a diagram of an embodiment of an email notification. The exemplary email notification shown herein is sent according to the frequency specified in FIG. 17. As shown in the example, the email contains lists of content that has been obtained from the sources and assigned to the intended recipient (i.e., Christie Suttemeier). In the example shown, the source (e.g., Internal Test 1, @rahimthedream and @tylerwillis) and assignor (e.g., CK Alert and Christie's Demo Alert) are shown next to each item of assigned content.

In some embodiments, clicking on the name of the assigned content (e.g., "check this out . . . ") causes the user to navigate to a user interface which provides controls for taking actions on that piece of content (e.g., deleting the piece of content, responding to the content, republishing the content, etc.). In some embodiments, clicking on the name of the source (e.g., Internal Test 1) causes the user to navigate to a user interface which displays content obtained from that source (e.g., relevant content from the Internal Test 1 Facebook page), as well as controls for performing actions on the presented content.

The previous figures show some exemplary features and associated user interfaces for supporting those features. In some embodiments, features or services in addition to those described above are supported or otherwise provided. For example, in some embodiments, a central user interface also includes a support management tool (not shown). One example of a support management tool is Get Satisfaction. A support management tool provides users with the ability to create a community of members where each member may have authorization to review or respond to the monitored content. In some cases, the members of the community are third party users or are not officially related to or tied to an entity of interest. For example, using the example of Tummy Rub dog toys, the community members may simply be dog owners who take an interest in and enjoy commenting and/or discussing dog related topics, including dog toys. These user are not necessarily hired by or officially related to (for example) the Tummy Rub company. In some embodiments, a user interface provides controls for managing parameters related to the community (e.g., adding/removing members, assigning privileges and/or permissions to members, etc.). In some embodiments, the support management tool may appear as tab at a Facebook page at the Facebook platform and settings or changes made via a user interface are propagated to or applied to a related source (e.g., a specific Facebook page) or platform (e.g., Facebook).

In some embodiments, a user interface is configured to store (and present, if requested) a history of presented content and/or associated actions and relevant metadata, such as who the action was taken by (e.g., the name of a specific user) and the date/time on which that action was taken. A benefit of storing the history is to provide audit trails for future reference and also to organize workflow between multiple users. In a various embodiments, a user interface includes various controls for selecting and displaying an audit or history trail of interested. For example, fields which may be specified via a user interface include source (e.g., Facebook page Tummy Rub), assignor, assignee, state (e.g., Inbox, Archived, Deleted), etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for monitoring sources, comprising:
receiving, at a central user interface, inputs identifying a plurality of online sources associated with a plurality of different websites;
using a processor to allow the central user interface to communicate with the plurality of online sources associated with the plurality of different websites in order to obtain content published at one or more sources of the plurality of online sources;
displaying, via the central user interface, the content as one or more pieces of obtained content with one or more controls which, if selected, cause an action to be performed on the one or more pieces of obtained content, the displaying based at least in part on a type of sorting including one or more of the following: creation time of the one or more pieces of obtained content, a computed importance of the one or more pieces of obtained content, a user to whom the one or more pieces of obtained content is assigned, a computed importance of a creator of the one or more pieces of obtained content, whether media is attached to the one or more pieces of obtained content, or a sentiment assigned to the one or more pieces of obtained content;
receiving an input comprising a selection of a control that is selected from the one or more controls; and
performing an action associated with the control that is selected from the one or more controls on at least one piece of the obtained content that publishes a result associated with the action on the central user interface or at an online source using an application programming interface (API) associated with a website corresponding to the online sources, the action including one or more of the following: assigning at least one of the obtained content, assigning a sentiment to at least one of the obtained content, replying to at least one of the obtained content, deleting at least one of the obtained content, or republishing at least one of the obtained content.

2. The method of claim 1, wherein the content includes one or more of the following: text, images, rich media, uniform resource locators (URLs) or associated metadata, wherein associated metadata includes a comment associated with the content.

3. The method of claim 1, further comprising determining, based at least in part on a permission associated with a user, whether the user is permitted to perform the action.

4. The method of claim 1, further comprising:
receiving an indication that the control is selected; and
performing the action associated with the control.

5. The method of claim 1, further comprising storing a record associated with the performed action, wherein the record includes date and/or time information.

6. The method of claim 5, further comprising displaying a plurality of previously performed actions based at least in part on the record.

7. The method of claim 1, further comprising displaying a graph of sentiment over time based at least in part on the sentiment assigned to at least one of the one or more pieces of obtained content.

8. The method of claim 1, further comprising:
receiving, via the central user interface, one or more keywords and a selected action to be performed on content containing the one or more keywords;
determining which of the obtained content contains the one or more keywords; and
performing the selected action on the content which contains the one or more keywords.

9. The method of claim 1, wherein assigning at least one of the one or more pieces of obtained content comprises one or more of the following: assigning to a user or assigning to a role, wherein one or more users are associated with the role.

10. The method of claim 9, wherein assigning to a user comprises prioritizing the content assigned to the user based at least in part on one or more of the following: whether a piece of content is assigned manually, whether a piece of content is assigned automatically, a role of an assignor or an identity of an assignor.

11. The method of claim 1, wherein displaying, via the central user interface, the obtained content is based at least in part on a type of device through which the central user interface is accessed.

12. The method of claim 1, wherein using a processor to communicate with a plurality of sources in order to obtain at least one piece of content from each one of the plurality of sources is in response to a detected change of at least one of the plurality of sources.

13. A system for monitoring sources, comprising:
a hardware processor; and
a memory coupled with the processor, the memory configured to provide the processor with instructions which when executed cause the processor to:
receive, at a central user interface, inputs identifying a plurality of online sources associated with a plurality of different websites;
communicate, via the central user interface, with the plurality of online sources associated with the plurality of different websites, in order to obtain content published at one or more sources of the plurality of online sources;
display, via the central user interface, the content as one or more pieces of obtained content with one or more controls which, if selected, cause an action to be performed on the one or more pieces of obtained content, the displaying based at least in part on a type of sorting including one or more of the following: creation time of the one or more pieces of obtained content, a computed importance of the one or more pieces of obtained content, a user to whom the one or more pieces of obtained content is assigned, a computed importance of a creator of the one or more pieces of obtained content, whether media is attached to the one or more pieces of obtained content, or a sentiment assigned to the one or more pieces of obtained content;
receive an input comprising a selection of a control that is selected from the one or more controls; and
perform an action associated with the control that is selected from the one or more controls on at least one piece of the obtained content that publishes a result associated with the action on the central user interface or at an online source using an application programming interface (API) associated with a website corresponding to the online sources, the action including one or more of the following: assigning at least one of the obtained content, assigning a sentiment to at least one of the obtained content, replying to at least one of the obtained content, deleting at least one of the obtained content, or republishing at least one of the obtained content.

14. The system of claim 13, wherein the content includes one or more of the following: text, images, rich media, uniform resource locators (URLs) or associated metadata, wherein associated metadata includes a comment associated with the content.

15. The system of claim 13, wherein the memory is further configured to provide the processor with instructions which when executed cause the processor to determine, based at least in part on a permission associated with a user, whether the user is permitted to perform the action.

16. The system of claim 13, wherein the memory is further configured to provide the processor with instructions which when executed cause the processor to:
receive an indication that the control is selected; and
perform the action associated with the control.

17. The system of claim 13, wherein the memory is further configured to provide the processor with instructions which when executed cause the processor to store a record associated with the performed action, wherein the record includes date and/or time information.

18. The system of claim 17, wherein the memory is further configured to provide the processor with instructions which when executed cause the processor to display a plurality of previously performed actions based at least in part on the record.

19. The system of claim 13, wherein the memory is further configured to provide the processor with instructions which when executed cause the processor to display a graph of sentiment over time based at least in part on the sentiment assigned to at least one of the one or more pieces of obtained content.

20. The system of claim 13, wherein the memory is further configured to provide the processor with instructions which when executed cause the processor to:
receive, via the central user interface, one or more keywords and a selected action to be performed on content containing the one or more keywords;
determine which of the obtained content contains the one or more keywords; and
perform the selected action on the content which contains the one or more keywords.

21. The system of claim 13, wherein the instructions for assigning at least one of the one or more pieces of obtained content includes instructions for one or more of the following: assigning to a user or assigning to a role, wherein one or more users are associated with the role.

22. The system of claim 21, wherein the instructions for assigning to a user at least one of the one or more pieces of obtained content includes instructions for prioritizing the content assigned to the user based at least in part on one or more of the following: whether a piece of content is assigned manually, whether a piece of content is assigned automatically, a role of an assignor or an identity of an assignor.

23. The system of claim 13, wherein the instructions for display, via the central user interface, the obtained content is based at least in part on a type of device through which the central user interface is accessed.

24. The system of claim 13, wherein the instructions for communicating with the plurality of sources in order to obtain at least one piece of content from each one of the plurality of sources is in response to a detected change of at least one of the plurality of sources.

25. A computer program product for publishing content, the computer program product being embodied in a non-transitory computer readable storage medium and comprising computer instructions for:
receiving, at a central user interface, inputs identifying a plurality of online sources associated with a plurality of different websites;
using a processor to allow the central user interface to communicate with the plurality of online sources associated with the plurality of different websites in order to obtain content published at one or more sources of the plurality of online sources;
displaying, via the central user interface, the content as one or more pieces of obtained content with one or more controls which, if selected, cause an action to be performed on the one or more pieces of obtained content, the displaying based at least in part on a type of sorting including one or more of the following: creation time of the one or more pieces of obtained content, a computed importance of the one or more pieces of obtained content, a user to whom the one or more pieces of obtained content is assigned, a computed importance of a creator of the one or more pieces of obtained content, whether media is attached to the one or more pieces of obtained content, or a sentiment assigned to the one or more pieces of obtained content;
receiving an input comprising a selection of a control that is selected from the one or more controls; and
performing an action associated with the control that is selected from the one or more controls on at least one piece of the obtained content, that publishes a result associated with the action on the central user interface or at an online source using an application programming interface (API) associated with a website corresponding to the online sources, the action including one or more of the following: assigning at least one of the obtained content, assigning a sentiment to at least one of the obtained content, replying to at least one of the obtained content, deleting at least one of the obtained content, or republishing at least one of the obtained content.

26. The computer program product of claim 25, wherein the content includes one or more of the following: text, images, rich media, uniform resource locators (URLs) or associated metadata, wherein associated metadata includes a comment associated with the content.

27. The computer program product of claim 25, further comprising computer instructions for storing a record associated with the performed action, wherein the record includes date and/or time information.

28. The computer program product of claim 27, further comprising computer instructions for displaying a plurality of previously performed actions based at least in part on the record.

29. The computer program product of claim 25, further comprising computer instructions for displaying a graph of sentiment over time based at least in part on the sentiment assigned to at least one of the one or more pieces of obtained content.

* * * * *